(12) United States Patent
Lee et al.

(10) Patent No.: US 11,350,701 B2
(45) Date of Patent: Jun. 7, 2022

(54) LACELESS SHOE

(71) Applicant: adidas AG, Herzogenaurach (DE)

(72) Inventors: Fu Wen Lee, Herzogenaurach (DE);
LuLu Chen, Herzogenaurach (DE);
Sam Forester, Herzogenaurach (DE)

(73) Assignee: ADIDAS AG, Herzogenaurach (DE)

( * ) Notice: Subject to any disclaimer, the term of this patent is extended or adjusted under 35 U.S.C. 154(b) by 358 days.

(21) Appl. No.: 16/553,814

(22) Filed: Aug. 28, 2019

(65) Prior Publication Data

US 2019/0380441 A1 Dec. 19, 2019

Related U.S. Application Data

(63) Continuation-in-part of application No. 15/283,709, filed on Oct. 3, 2016, now Pat. No. 10,905,197, and (Continued)

(30) Foreign Application Priority Data

Oct. 9, 2015 (DE) .......................... 102015219614.3
Oct. 9, 2015 (DE) .......................... 102015219636.4

(51) Int. Cl.
*A43B 23/02* (2006.01)
*A43B 9/00* (2006.01)
(Continued)

(52) U.S. Cl.
CPC ............ *A43B 23/0255* (2013.01); *A43B 9/00* (2013.01); *A43D 3/02* (2013.01); *A43D 11/003* (2013.01);
(Continued)

(58) Field of Classification Search
CPC .... A43B 1/04; A43B 5/00; A43B 5/02; A43B 5/025; A43B 9/00; A43B 23/0235;
(Continued)

(56) References Cited

U.S. PATENT DOCUMENTS

| 2,069,083 A | 1/1937 | Adamson |
| 2,147,197 A | 2/1939 | Glidden |

(Continued)

FOREIGN PATENT DOCUMENTS

| CN | 2448147 | 9/2001 |
| CN | 101554256 | 10/2009 |

(Continued)

OTHER PUBLICATIONS

U.S. Appl. No. 16/553,765, Non-Final Office Action dated Aug. 4, 2021, 16 pages.

(Continued)

*Primary Examiner* — Michael A Tolin
(74) *Attorney, Agent, or Firm* — Kilpatrick Townsend & Stockton LLP

(57) ABSTRACT

Described is a shoe upper for a shoe, in particular an athletic shoe, wherein the shoe upper is laceless and comprises: (a.) a lateral portion; (b.) a medial portion; and (c.) at least an elastic intermediate portion between the lateral portion and the medial portion, wherein the stiffness of at least one of the lateral portion and the medial portion is at least 2 times higher than the stiffness of the elastic intermediate portion.

17 Claims, 12 Drawing Sheets

Related U.S. Application Data a continuation-in-part of application No. 15/283,611, filed on Oct. 3, 2016, now Pat. No. 10,426,227.

(51) Int. Cl.

| | |
|---|---|
| *A43D 3/02* | (2006.01) |
| *B29C 51/10* | (2006.01) |
| *B29C 51/14* | (2006.01) |
| *B29C 51/42* | (2006.01) |
| *B29D 35/14* | (2010.01) |
| *B29L 31/50* | (2006.01) |
| *D06M 15/564* | (2006.01) |
| *A43D 11/00* | (2006.01) |
| *D06N 3/00* | (2006.01) |
| *B29D 35/12* | (2010.01) |
| *B29D 35/00* | (2010.01) |

(52) U.S. Cl.
CPC ............ B29C 51/10 (2013.01); B29C 51/145 (2013.01); B29C 51/421 (2013.01); B29D 35/0072 (2013.01); B29D 35/126 (2013.01); B29D 35/146 (2013.01); D06M 15/564 (2013.01); D06N 3/0009 (2013.01); *B29C 2791/00* (2013.01); *B29C 2791/006* (2013.01); *B29L 2031/505* (2013.01); *D06M 2200/12* (2013.01); *D06N 2211/106* (2013.01)

(58) Field of Classification Search
CPC ............ A43B 23/0245; A43B 23/0255; A43B 23/026; A43B 23/027; A43B 23/0275; A43C 11/002; A43C 11/006; A43C 15/16; A43D 3/02; A43D 9/00; A43D 11/003; B29C 43/12; B29C 51/004; B29C 51/10; B29C 51/12; B29C 51/145; B29C 51/36; B29C 51/421; B29C 2791/00; B29C 2791/006; B29D 35/0063; B29D 35/0072; B29D 35/126; B29D 35/128; B29D 35/146; B29D 35/148; B29L 2031/505; D06M 15/564; D06M 2200/12; D06N 3/0009; D06N 2211/106

See application file for complete search history.

(56) References Cited

U.S. PATENT DOCUMENTS

| | | | |
|---|---|---|---|
| 2,582,298 A | 1/1952 | Ushakoff et al. | |
| 3,007,262 A | 11/1961 | Richards | |
| 3,231,454 A | 1/1966 | Williams | |
| 3,720,971 A | 3/1973 | Wyness et al. | |
| 3,769,723 A | 11/1973 | Masterson et al. | |
| 3,931,685 A | 1/1976 | Laukaitis | |
| 4,120,101 A | 10/1978 | Drew | |
| 4,356,642 A | 11/1982 | Herman | |
| 4,681,648 A | 7/1987 | Maeda et al. | |
| 4,811,497 A | 3/1989 | Merino | |
| 4,893,418 A | 1/1990 | Ogden | |
| 5,275,775 A | 1/1994 | Riecken | |
| 5,358,394 A | 10/1994 | Riecken et al. | |
| 5,392,534 A | 2/1995 | Grim | |
| 5,404,659 A | 4/1995 | Burke et al. | |
| 5,529,826 A | 6/1996 | Tailor et al. | |
| 5,555,650 A | 9/1996 | Peel et al. | |
| 5,617,650 A | 4/1997 | Grim | |
| 5,797,200 A | 8/1998 | Hess et al. | |
| 5,879,614 A | 3/1999 | Harrison | |
| 5,940,991 A | 8/1999 | Cabalquinto | |
| 5,976,451 A | 11/1999 | Skaja et al. | |
| 5,987,778 A | 11/1999 | Stoner | |
| 6,299,962 B1 | 10/2001 | Davis et al. | |
| 6,533,885 B2 | 3/2003 | Davis et al. | |
| 6,558,784 B1 | 5/2003 | Norton et al. | |
| 6,670,029 B2 | 12/2003 | Norton et al. | |
| 7,080,467 B2 | 7/2006 | Marvin et al. | |
| 7,178,267 B2 | 2/2007 | Skaja et al. | |
| 7,350,321 B2 | 4/2008 | Soon et al. | |
| 7,464,489 B2 | 12/2008 | Ho | |
| 8,109,014 B2 | 2/2012 | Miller et al. | |
| 8,266,749 B2 | 9/2012 | Dua et al. | |
| 8,372,234 B2 | 2/2013 | Loveder | |
| 8,424,221 B2 | 4/2013 | Litchfield et al. | |
| 8,490,299 B2 * | 7/2013 | Dua | D04B 1/16 36/50.1 |
| 9,655,407 B2 | 5/2017 | Reinhardt et al. | |
| 9,789,644 B2 | 10/2017 | Iovu | |
| 2002/0012784 A1 | 1/2002 | Norton et al. | |
| 2002/0078591 A1 | 6/2002 | Morrone | |
| 2003/0221336 A1 | 12/2003 | Krstic | |
| 2005/0126038 A1 | 6/2005 | Skaja et al. | |
| 2006/0042125 A1 | 3/2006 | Chen et al. | |
| 2006/0191164 A1 | 8/2006 | Dinndorf et al. | |
| 2007/0022627 A1 | 2/2007 | Sokolowski et al. | |
| 2007/0056189 A1 | 3/2007 | Schafer et al. | |
| 2008/0066344 A1 | 3/2008 | Kelley | |
| 2008/0196278 A1 | 8/2008 | Zanatta et al. | |
| 2008/0250668 A1 * | 10/2008 | Marvin | A43B 23/0205 36/54 |
| 2009/0019732 A1 | 1/2009 | Sussmann | |
| 2009/0025253 A1 | 1/2009 | Harper et al. | |
| 2012/0180340 A1 | 7/2012 | Crowley, II et al. | |
| 2012/0211928 A1 | 8/2012 | Takai et al. | |
| 2012/0297643 A1 | 11/2012 | Shaffer et al. | |
| 2013/0014900 A1 | 1/2013 | Hull et al. | |
| 2013/0042501 A1 | 2/2013 | Velazquez et al. | |
| 2013/0131854 A1 | 5/2013 | Regan et al. | |
| 2013/0152423 A1 | 6/2013 | Wu | |
| 2013/0180023 A1 | 7/2013 | Gross et al. | |
| 2014/0237738 A1 | 8/2014 | Johnson et al. | |
| 2014/0237853 A1 | 8/2014 | Fisher et al. | |
| 2014/0239556 A1 | 8/2014 | Fisher et al. | |
| 2015/0101133 A1 | 4/2015 | Manz et al. | |
| 2015/0101134 A1 | 4/2015 | Manz et al. | |
| 2015/0128453 A1 | 5/2015 | Oroszi et al. | |
| 2015/0208762 A1 | 7/2015 | Reinhardt et al. | |
| 2015/0210034 A1 | 7/2015 | Tarrier et al. | |
| 2015/0223552 A1 | 8/2015 | Love et al. | |
| 2015/0282544 A1 | 10/2015 | Lankes et al. | |
| 2015/0305448 A1 | 10/2015 | Cavaliere et al. | |
| 2016/0136869 A1 | 5/2016 | Iovu | |
| 2017/0368735 A1 | 12/2017 | Iovu | |

FOREIGN PATENT DOCUMENTS

| | | |
|---|---|---|
| CN | 102450770 | 5/2012 |
| CN | 102578759 | 7/2012 |
| CN | 103844428 | 6/2014 |
| CN | 203665810 | 6/2014 |
| CN | 104824901 | 8/2015 |
| DE | 602004005441 | 5/2007 |
| DE | 102011100642 | 11/2012 |
| EP | 0930962 | 6/2003 |
| EP | 1621089 | 2/2006 |
| EP | 2594146 | 5/2013 |
| EP | 2316292 | 7/2014 |
| EP | 2792264 A2 | 10/2014 |
| EP | 2881236 | 6/2015 |
| EP | 2904920 | 8/2015 |
| EP | 3266329 | 1/2018 |
| GB | 1442343 | 7/1976 |
| JP | 422125 | 2/1967 |
| JP | 45-10357 | 5/1970 |
| JP | H07-40486 | 2/1995 |
| JP | 3052665 | 7/1998 |
| JP | 2009219786 | 10/2009 |
| JP | 2011092724 | 5/2011 |
| JP | 5075391 | 11/2012 |
| JP | 2014210179 | 11/2014 |
| WO | 0036943 | 6/2000 |
| WO | 2013123922 | 8/2013 |

(56) References Cited

FOREIGN PATENT DOCUMENTS

| WO | 2014070018 | 5/2014 |
|---|---|---|
| WO | 2014130319 | 8/2014 |
| WO | 2015167645 | 11/2015 |

OTHER PUBLICATIONS

German Patent Application No. 102015219614.3, Office Action dated Jul. 13, 2021, 12 pages (English translation provided).
German Patent Application No. 102015219636.4, Office Action dated Jan. 19, 2021, 10 pages (English translation provided).
European Patent Application No. 16192791.8, Office Action dated Aug. 17, 2021, 6 pages.
Chinese Application No. 202010685236.9, Office Action dated May 31, 2021, 17 pages (English machine translation provided).
European Application No. 16192791.8, Office Action dated Dec. 9, 2020, 7 pages.
"Nike Unveils Seamless, Thermo-Molded "Vac Tech" Sneakers", available at http://www.ecouterre.com/nike-unveils-seamless-thermo-molded-vac-tech-sneakers, Oct. 12, 2011, 12 pages.
"Nike Vac Tech Premium Wheat Pack", http://www.kicksonfire.com/tag/nike-vac-tech-premium-wheat-pack, (known to applicant no later than Oct. 16, 2013).
"Nike's New Thermo-Molded Sneakers Are Like Sculptures For Your Feet_ Co.Design _ business + design", available at http://www.fastcodesign.com/1665178/nike-s-new-thermo-molded-sneakers-are-like-sculptures-for-your-feet (known to Applicant no later than Oct. 16, 2013), 3 pages.
U.S. Appl. No. 15/283,611, Final Office Action, dated Oct. 9, 2018, 9 pages.
U.S. Appl. No. 15/283,611, Non-Final Office Action, dated Apr. 3, 2018, 9 pages.
U.S. Appl. No. 15/283,611, Notice of Allowance, dated May 22, 2019, 9 pages.
U.S. Appl. No. 15/283,709, Advisory Action, dated Sep. 13, 2019, 4 pages.
U.S. Appl. No. 15/283,709, Corrected Notice of Allowance, dated Sep. 23, 2020, 5 pages.
U.S. Appl. No. 15/283,709, Final Office Action, dated Jul. 1, 2019, 19 pages.
U.S. Appl. No. 15/283,709, Non-Final Office Action, dated Jan. 29, 2019, 11 pages.
U.S. Appl. No. 15/283,709, Non-Final Office Action, dated May 29, 2020, 6 pages.
U.S. Appl. No. 15/283,709, Notice of Allowance, dated Sep. 11, 2020, 6 pages.
*Chinese Patent Application No. 201610881696.2, Office Action, dated Feb. 25, 2019, 10 pages (English machine translation provided).
Chinese Patent Application No. 201610881696.2, Office Action, dated May 28, 2018, 21 pages (English machine translation provided).
*Chinese Patent Application No. 201610881696.2, Office Action, dated Oct. 8, 2019, 8 pages (English machine translation provided).
*Chinese Patent Application No. 201610881962.1, Office Action, dated Oct. 8, 2019, 17 pages (English machine translation provided).
Chinese Patent Application No. 201610881962.1, Office Action, dated May 28, 2018, 22 pages (English machine translation provided).
Chinese Patent Application No. 201610881962.1, Office Action, dated Feb. 22, 2019, 25 pages (English translation provided).
*German Patent Application No. 102015219614.3, Office Action, dated Sep. 29, 2017, 12 pages (English machine translation provided).
German Patent Application No. 102015219614.3, Office Action, dated Jul. 7, 2016, 9 pages (English summary of Office Action provided in Transmittal Letter accompanying IDS filed Oct. 3, 2016 in U.S. Appl. No. 15/283,611).
German Patent Application No. 102015219636.4, Office Action, dated Jul. 6, 2016, 9 pages (English summary of Office Action provided in Transmittal Letter accompanying IDS filed Oct. 3, 2016 in U.S. Appl. No. 15/283,709).
German Patent Application No. 102015219636.4, Office Action, dated Nov. 13, 2017, 9 pages (English machine translation provided).
European Patent Application No. 16192791.8, Extended European Search Report, dated Feb. 28, 2017, 8 pages.
*European Patent Application No. 16192791.8, Office Action, dated Mar. 16, 2020, 8 pages.
European Patent Application No. 16192792.6, Extended European Search Report, dated Feb. 7, 2017, 8 pages.
European Patent Application No. 16192792.6, Office Action, dated Nov. 6, 2019, 4 pages.
Japanese Patent Application No. 2016-198713, Office Action, dated May 7, 2019, 18 pages (English machine translation provided).
Japanese Patent Application No. 2016-198713, Office Action, dated Nov. 14, 2017, 20 pages (English machine translation provided).
*Japanese Patent Application No. 2016-198713, Office Action, dated Oct. 8, 2019, 4 pages (English machine translation provided).
Japanese Patent Application No. 2016-198713, Office Action, dated Mar. 20, 2018, 7 pages (English machine translation provided).
*Japanese Patent Application No. 2016-198713, Trial and Appeal Decision dated Feb. 4, 2020, 4 pages (English machine translation provided).
*Jones et al., Joining Textiles: Principles and Applications, Woodland Publishing, p. 232, 2013.
Chinese Patent Application No. 202010685236.9, Office Action dated Dec. 29, 2021, 23 pages (English machine translation provided).

* cited by examiner

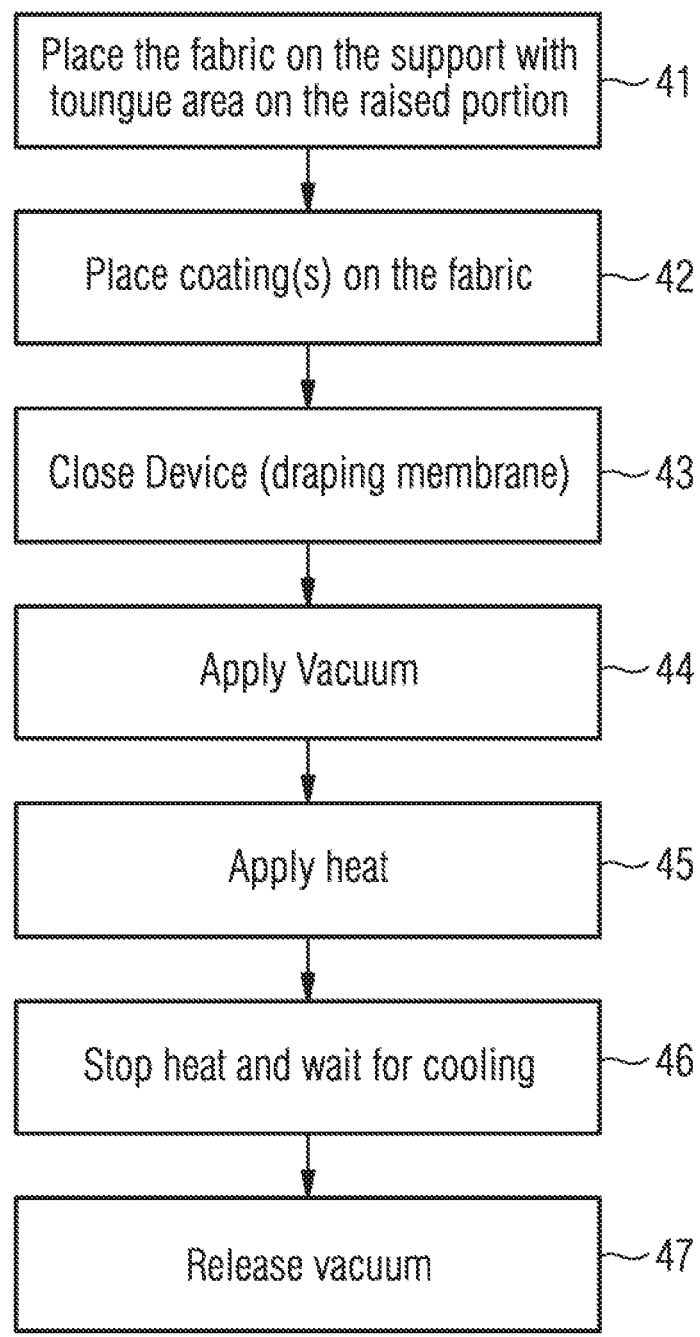

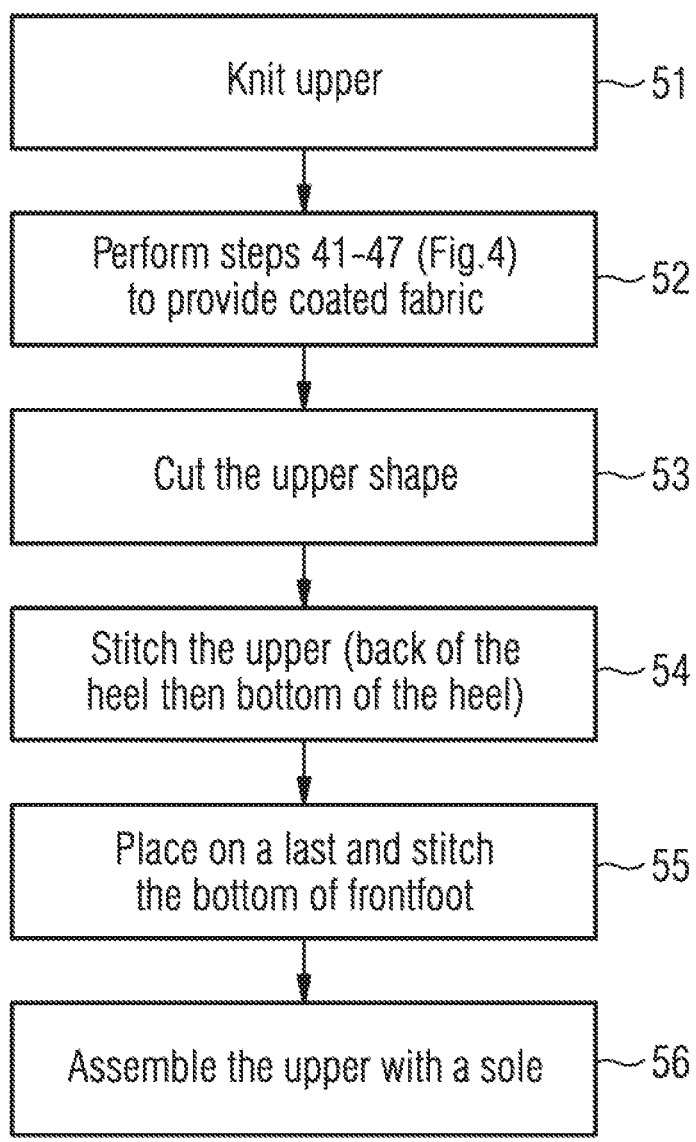

LACELESS SHOE

CROSS REFERENCE TO RELATED APPLICATION

This application is a continuation-in-part of U.S. patent application Ser. No. 15/283,611, filed on Oct. 3, 2016, entitled LACELESS SHOE ("the '611 application") now U.S. Pat. No. 10,426,227, which is related to and claims priority benefits from German Patent Application No. DE102015219614.3, filed on Oct. 9, 2015, entitled LACELESS SHOE ("the '614 application"), and is a continuation-in-part of U.S. patent application Ser. No. 15/283,709, filed on Oct. 3, 2016, entitled MANUFACTURING METHOD FOR COATING A FABRIC WITH A THREE-DIMENSIONAL SHAPE ("the '709 application") now U.S. Pat. No. 10,905,197, which is related to and claims priority benefits from German Patent Application No. DE102015219636.4, filed on Oct. 9, 2015, entitled "MANUFACTURING METHOD FOR COATING A FABRIC WITH A THREE-DIMENSIONAL SHAPE" ("the '636 application"). The '611, '614, '709, and '636 applications are hereby incorporated herein in their entirety by this reference.

FIELD OF THE INVENTION

The present invention relates to a shoe upper for a shoe, and in particular (although not exclusively) an athletic shoe, wherein the shoe upper is laceless.

BACKGROUND

Shoes are commonly equipped with laces to secure the shoes. Each shoelace typically passes through a series of holes, eyelets, loops or hooks on either side of the shoe. Using the lacing allows the shoe to open wide enough for the foot to be inserted or removed. Tightening the lacing and tying off the ends secures the foot within the shoe.

Laceless shoes have been developed to dispense with tightening the laces after the shoe has been put on. On the one hand, this simplifies the handling of the shoe; on the other hand, a laceless shoe may be beneficial in particular if it is an athletic shoe like for example a soccer shoe, where a smooth surface is desired to allow for better control of the ball.

For example, U.S. Pat. No. 4,811,497 discloses a sports shoe having a central cut of material in the vamp section, from the vicinity of the toe to the top of the vamp which has a series of strips that remain connected to each other in a standard section of elastic material connected to these by means of a sewing, while being able to separate from each other when required to do so upon putting on or taking off the shoe.

U.S. Pat. No. 5,555,650 describes a laceless athletic shoe lacking both the laces and a tongue. The upper includes an integral, elastic area that expands to receive the wearer's foot and contracts to conform to the wearer's ankle thereafter. Combined with a cinching system positioned across the top of the foot, this elastic area secures the shoe about the wearer's foot.

WO 2014/130319 discloses an article of footwear including an upper, a sole, and a strap attached at one end to the medial side of the footwear, either at the side of the upper or at the sole, and attached at the other end to the lateral side of the footwear, either at the side of the upper or at the sole. The strap includes a layer made of reactive material. This layer is referred to as a "reactive layer". The reactive layer is constrained from expanding outwards. When a person wearing the footwear engages in an activity, such as leaping or accelerating, that puts the strap under increased longitudinal tension, the reactive layer increases its thickness and/or width and thus more firmly holds the footwear onto the foot.

EP 2 316 292 A1 describes a boot for football (e.g. five- or seven-a-side football) comprising a sole, an upper associated to the sole which extends substantially continuously in order to cover, in use, at least the instep, the sides of the foot at the back of the heel, and has an upper edge which defines an opening for insertion of the foot. The upper comprises a rear insert which in use covers the back of the heel, which insert is made of a foldable and/or yielding material destined to be folded towards the inside of the boot in order to enable insertion of the foot into the boot from the rear part of the boot and a front insert which in use covers the instep, also made of a yielding material destined to bind the upper part of the boot uniformly without use of laces and loops and improving comfort and foot-to-ball sensitivity.

WO 2014/070018 discloses a soccer boot comprising slits where the closing mechanism is formed by a strip of elastic material that covers the slit and is attached to the shaft material. For wider feet, the elastic material will stretch during use, but a proper choice of the elastic material will ensure a snug fit of the boot to the foot. However, other closing mechanisms, such as a lace, can also be made to function satisfactory.

However, the laceless shoes known in the prior art have several disadvantages. Often, they do not provide the desired support to the foot which wearers are used to from shoes with laces. Good support of the foot is particularly crucial for athletic shoes, and more particularly for shoes for sports involving cutting movements (e.g. soccer, football, rugby, etc.), as the forces applied to the shoe by the wearer are high. Shoes of the prior art may lead to a higher risk of twisting the ankle, in particular during cutting movements, and at least give a wrong feeling to the wearer of not being properly supported. Furthermore, some laceless shoes known in the prior art are very difficult to put on or take off.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various embodiments of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, a laceless shoe upper for a shoe may include a lateral portion, a medial portion, and an elastic intermediate portion between the lateral portion and the medial portion. A stiffness of at least one of the lateral portion and the medial portion may be at least 2 times higher than a stiffness of the elastic intermediate portion.

In some embodiments, the lateral portion may be adapted to extend from a lateral junction of the upper with a sole to the elastic intermediate portion. The medial portion may be adapted to extend from a medial junction of the upper with the sole to the elastic intermediate portion. The elastic intermediate portion may extend at least partly on a dorsal portion of the upper. At least a part of a center line of the elastic intermediate portion may extend in the medial portion of the shoe upper. A length of the elastic intermediate portion may be between 20% and 50% of a length of the shoe upper. A width of the elastic intermediate portion may be between 10% and 60% of the width of the shoe upper.

In some embodiments, the shoe upper includes at least one continuous one-piece layer at least partially covering the lateral portion and at least partially covering the elastic intermediate portion.

The stiffness of the at least one of the medial portion and the lateral portion may be between 2 and 50 times higher than the stiffness of the elastic intermediate portion.

In some embodiments, at least one of the medial portion and the lateral portion comprises a coating applied to a base layer, the coating being adapted to modify the stiffness of the base layer.

The shoe upper may include at least one forefoot portion with a stiffness at least equal to the stiffness of the medial portion.

The shoe upper may include at least one a heel portion that includes a coating applied to a base layer, the coating being adapted to modify the stiffness of the base layer.

In some embodiments, the shoe upper may include a knitted layer. The kitted layer may be knitted in one piece and may extend on at least 80% of a surface area of the shoe upper. The knitted layer may include a first area having a first knit structure and a second area having a second knit structure different from the first knit structure.

In some embodiments, the shoe upper may include an elastic collar surrounding a shoe opening. The shoe upper may include a holding tab proximate a junction between the elastic intermediate portion and the collar.

According to certain embodiments of the present invention, a shoe may include a sole and a laceless shoe upper attached to the sole. The shoe upper may include a lateral portion, a medial portion, and an elastic intermediate portion between the lateral portion and the medial portion. A stiffness of at least one of the lateral portion and the medial portion may be at least 2 times higher than a stiffness of the elastic intermediate portion.

The shoe may include a sock arranged at least partially inside the shoe upper.

In some embodiments, the shoe may include an elastic collar surrounding a shoe opening. The shoe may also include a holding tab proximate a junction between the elastic intermediate portion and the collar. A first end of the holding tab may be attached to the shoe upper, and a second end of the holding tab may be attached to the sock. The first end of the holding tab may be attached to the shoe upper at a top of the elastic intermediate portion.

According to certain embodiments of the present invention, a method of manufacturing a shoe upper can include forming a lateral portion of the shoe upper, forming a medial portion of the shoe upper, and forming an elastic intermediate portion of the shoe upper such that a stiffness of at least one of the lateral portion and the medial portion is at least two times higher than a stiffness of the elastic intermediate portion.

In some embodiments, the method may include at least partially coating the lateral portion and/or the medial portion.

In some embodiments, the lateral portion and/or the medial portion may include a fabric. The method may also include providing the fabric comprising a first surface and a second surface opposite the first surface. The method may also include placing the fabric on a surface of a support structure. The support structure may be adapted to permit gas circulation through at least a portion of its surface and include at least a raised or embossed portion on its surface. The fabric may be placed such that the first surface of the fabric faces the surface of the support structure and such that the fabric is arranged at least in part over the raised or embossed portion of the support structure. The method may also include providing at least one coating comprising a first surface and a second surface opposite the first surface. The method may also include placing the at least one coating at least partially on the second surface of the fabric, such that the first surface of the at least one coating faces the fabric. The method may also include applying a gas pressure differential between the second surface of the at least one coating and the first surface of the fabric.

In some embodiments, the method may also include placing a draping membrane on the fabric and the at least one coating before the pressure differential is applied.

In some embodiments, the method may also include heating the at least one coating.

BRIEF DESCRIPTION OF THE DRAWINGS

In the following detailed description, embodiments of the invention are described referring to the following figures:

FIG. 4 is a flow chart of a method for manufacturing a shoe upper, according to certain embodiments of the present invention.

FIG. 5 is a flow chart of a method of manufacturing a shoe, according to certain embodiments of the present invention.

BRIEF DESCRIPTION

Figure 1A:
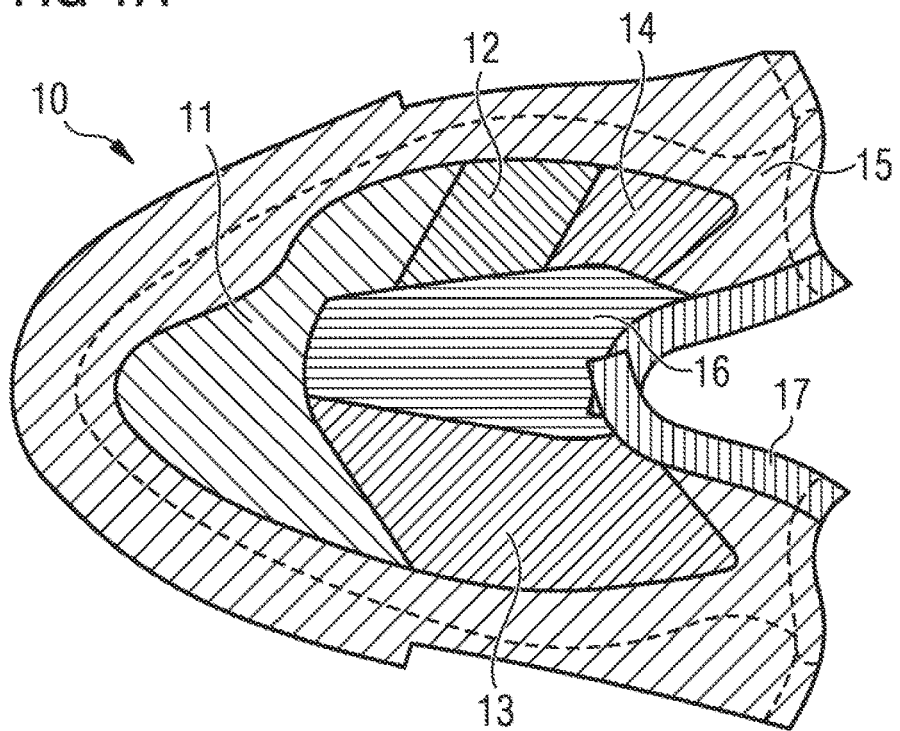
FIG. 1A is a top view of a knitted shoe upper, according to certain embodiments of the present invention.

Therefore, it is an objective of the present invention to provide a laceless shoe upper for a shoe, in particular an athletic shoe, which in the final shoe provides the foot of a wearer with sufficient support and at the same time allows a wearer to easily put on and take off the shoe.

This objective is met by different characteristics of the shoe, taken alone or in combination.

This objective is met by a shoe upper for a shoe, in particular an athletic shoe, wherein the shoe upper is laceless and comprises: (a.) a lateral portion; (b.) a medial portion; and (c.) at least an elastic intermediate portion between the lateral portion and the medial portion, wherein the stiffness of at least one of the lateral portion and/or the medial portion is at least two times higher than the stiffness of the elastic intermediate portion.

In some embodiments, a laceless shoe upper is a shoe upper without any laces for tightening the shoe. Moreover a shoe upper and a shoe in some embodiments may be devoid of attachment means. A shoe upper in some embodiments does not comprise attachment means having an open position and a closed position. Therefore the shoe upper in some embodiments does not comprise any attachment means such as laces, cables, hook-and-loop fasteners, straps, velcros, etc.

The intermediate portion of the shoe upper is understood as covering at least the U-throat of the shoe upper. The U-throat of a laceless shoe upper corresponds to the tongue of a conventional shoe upper with laces, i.e. it is a portion which is located over the instep of the foot and made to deform so as to permit introduction of the foot in the shoe and extraction of the foot out of the shoe.

The stiffness in this application is referred to as a ratio of the load (e.g. a force) applied to a piece of material over the deformation (e.g. a change in length) of this material. Measurements have been made using samples cut out of shoes, the samples being 20 mm large and 50 mm long from clamp to clamp. A strain has been applied by the clamps from 0% to 30% elongation of the original sample length and then released so the material may come back to its original length of 50 mm. The measurements of the third cycle of strain application have been used. In general, measurements with an elongation of more than 5% lead to accurate results.

The inventors realized that a laceless shoe upper comprising a lateral portion and a medial portion having a stiffness at least two times higher than the stiffness of an elastic intermediate portion provides for a shoe which provides sufficient support to a foot of a wearer, while at the same time allows the wearer to easily put on and take off the shoe. The necessary support to the foot is provided by the lateral portion and the medial portion having a significant higher stiffness than the intermediate portion, thereby limiting the strain of the lateral and medial portions such that the foot is firmly held in place even during cutting movements. On the other hand, the elastic intermediate portion having a stiffness of at least two times lower than the lateral and medial portion allows for the necessary widening of the shoe, such that the shoe can comfortably be put on and off.

The intermediate portion in the context of the present invention may for example be a dorsal portion of the shoe upper.

The lateral portion may be adapted to extend from a lateral junction of the upper with the sole to the elastic intermediate portion. In this way, the stability of the upper may be increased as the comparably stiff and inelastic lateral portion may be directly joined to the sole (e.g. by gluing, stitching or welding) and extend up to the elastic intermediate portion, thus covering the lateral side essentially over all of its height. This improves support of the foot, in particular during athletic activities, and most particularly during cutting movements.

The medial portion may be adapted to extend from a medial junction of the upper with the sole to the elastic intermediate portion. In this way, the stability of the upper may be increased as the comparably stiff and inelastic medial portion may be directly joined to the sole (e.g. by gluing, stitching or welding) and extend up to the elastic intermediate portion, thus covering the medial side essentially over all of its height. This improves support of the foot, in particular during athletic activities, and most particularly during cutting movements.

The shoe upper may comprise a unique elastic intermediate portion between the lateral portion and the medial portion. Furthermore, the elastic intermediate portion of the shoe upper may comprise a single, one-piece elastic material. Thus, the elastic intermediate portion may be designed with a smooth surface. This is in particular beneficial with some athletic shoes, e.g. a soccer or rugby shoe in order to provide for good ball control.

The elastic intermediate portion may extend at least partly on a dorsal portion. Furthermore, the shoe upper may be adapted so that the intermediate portion extends on the dorsal portion of a foot when the upper is integrated in a shoe. This provides for a better fit as the instep of the foot varies from person to person, and having the elastic portion between lateral and medial portion allows the shoe upper to adapt to the shape and size of the foot.

At least a part of the center line of the elastic intermediate portion may extend in the medial half of the shoe upper. More particularly, at least the section of the elastic intermediate portion adjacent the toe portion may extend in the medial half of the shoe upper. In this way, a better support (in particular during cutting movements) on the lateral side is achieved, as the comparably less elastic lateral portion may be made larger. Furthermore, if the shoe upper is to be used for example in a soccer shoe, the kick area on the top and lateral side of the shoe is larger as well. Indeed the kick area is beneficially stiffer. Also, the kick area may beneficially comprise a coating, in particular a gripping coating. As such coating may stiffen the upper, the elastic intermediate portion may be beneficially shifted toward the medial half of the shoe.

The length of the elastic intermediate portion may be between 20% and 60% of the length of the shoe upper. In some embodiments, the length of the elastic intermediate portion may be between 30% and 50% of the length of the shoe upper and may in particular be between 40% and 45% of the length of the shoe upper. The inventors realized that such a length of the elastic intermediate portion allows a wearer to comfortably put on and take off the shoe, while at the same time maintaining sufficient stability. In particular such length of the elastic dorsal portion permits the shoe to have sufficiently stiff portions so it may be maintained on the foot during athletic movements.

The width of the elastic intermediate portion may be between 10% and 60% of the width of the shoe upper. The width of the shoe upper is measured along the intersection of the surface of the shoe upper and of a cross-sectioning plane. In some embodiments, the width of the elastic intermediate portion may be between 20% and 40% of the width of the shoe upper. The width of the lowest part of the elastic intermediate portion (that is the part situated closest to the front of the elastic dorsal portion) may in particular be between 20% and 30% of the width of the shoe upper in this section of the shoe upper, and in some embodiments, 20% and 25%. The width of the highest part of the elastic intermediate portion (that is the part situated closest to the rear of the elastic dorsal portion, near the collar or opening of the shoe, for example) may in particular be between 25% and 50% of the width of the shoe upper in this section of the shoe upper, and in some embodiments, between 33% and 40%.

If the elastic intermediate portion does not have straight edges, the lengths and widths indicated above may be understood as average lengths and widths. For example, the width in the lowest part of the elastic intermediate portion may be understood as the average width of the lowest 10% of the elastic intermediate portion.

The shoe upper may further comprise at least one continuous one-piece layer at least partially covering the lateral portion and at least partially covering the intermediate portion. Thus, the transition between the elastic intermediate portion and the lateral portion may be made very smooth which is again particularly beneficial for example for a soccer shoe.

The shoe upper may more particularly beneficially comprise at least one continuous one-piece layer extending over the entire shoe upper. This provides a shoe upper and a shoe with a very consistent layer and no seams. Indeed, seams may locally modify the properties of the shoe. With no seam, the local properties of the shoe upper are better controlled. It also provides a much better fit and comfort to the wearer of the shoe. Also, while a shoe upper comprising different pieces attached together to form the upper may wear quickly because the seams are weak points of the shoe, a shoe upper comprising at least one continuous one-piece layer may be more resistant. Such continuous construction of a one-piece layer may also allow attaching different pieces on each of its sides and ensure the relative positioning of these pieces.

The stiffness of the medial portion may be between 2 and 30 times higher than the stiffness of the intermediate portion. In particular, the stiffness of the medial portion may be between 2 and 25 times higher, and more particularly between four and 20 times higher, for example about 5 times higher than the stiffness of the intermediate portion. In particular, the stiffness of the medial portion may be between 2 and 8 times higher for a strain of below 10%, more particularly between 3 and 6 times higher for a strain of below 10%, for example of about 4 times higher for a strain of below 10% than the stiffness of the intermediate portion. In particular, the stiffness of the medial portion may be between 3 and 20 times higher for a strain between 10% and 20%, and more particularly between 4 and 11 times higher for a strain between 10% and 20% than the stiffness of the intermediate portion. In particular, the stiffness of the medial portion may be between 5 and 25 times higher for a strain between 20% and 30%, and more particularly between 5 and 20 times higher for a strain between 20% and 30%, for example between 5 and 11 times higher for a strain between 20% and 30%, and in some embodiments about 5 times higher at 30% strain than the stiffness of the intermediate portion.

The medial portion may comprise a coating applied to a base layer, adapted to modify the stiffness of the base layer. In this way, the required ratio of the stiffness of the medial portion and the stiffness of the intermediate portion may be achieved. In particular, the stiffness of the medial portion is increased. A coating may also rigidify the shoe upper in the respective area, may provide waterproofing, may provide a better grip and/or may enhance the visual appearance of the shoe upper.

In some embodiments, a coating is a layer of a different material, in particular a material that is bonded to a base layer. In particular a coating may be a thin layer of polymer material bonded to a base layer such as for example a fabric, for example a knit fabric.

The coating may exhibit holes of any shape and size.

Alternatively or in combination, the coating may be in one piece on the shoe upper, or in different pieces. The shoe upper may in particular comprise a plurality of pieces of coating. At least some of the pieces of coating may at least partially overlap. The pieces of coating may be of the same material or at least one piece of coating may be of a first material and the other piece of coating may be of another material.

The coating may be applied in a solid or liquid state on the base layer. The coating may be applied in a solid state and then melted so as to bond to the base layer, or it may be glued on the shoe upper. Other methods such as for example stitching the coating on the base layer may be utilized additionally or alternatively in some embodiments.

The medial coating may extend from back to front of the shoe upper all along the length of the shoe on the medial side. This provides for support along the entire medial side of the shoe.

The stiffness of the lateral portion may be between 3 and 50 times higher than the stiffness of the intermediate portion. In particular the stiffness of the lateral portion may be between 3 and 40 times higher, and more particularly between 3 and 29 times higher, for example about 20 times higher than the stiffness of the intermediate portion. In particular, the stiffness of the lateral portion may be between 3 and 40 times higher for a strain below 10%, more particularly between 3 and 30 times higher for a strain below 10%, for example about 8 times higher for a strain below 10% than the stiffness of the intermediate portion.

In particular, the stiffness of the lateral portion may be between 10 and 40 times higher for a strain between 10% and 20%, and more particularly between 15 and 30 times higher for a strain between 10% and 20%, for example about 20 times higher for a strain between 10% and 20% than the stiffness of the intermediate portion. In particular, the stiffness of the lateral portion may be between 10 and 40 times higher for a strain between 20% and 30%, and more particularly between 14 and 29 times higher for a strain between 20% and 30%, for example between 22 and 29 times higher for a strain between 20% and 30%, or between 17 and 27 times higher at 30% strain than the stiffness of the intermediate portion.

The lateral portion may comprise a coating applied to a base layer, adapted to modify the stiffness of the base layer. In this way, the required ratio of the stiffness of the lateral portion and the stiffness of the intermediate portion may be achieved. In particular, the stiffness of the lateral portion is increased. A coating may also rigidify the shoe upper in the respective area, may provide waterproofing, may provide a better grip and/or may enhance the visual appearance of the shoe upper.

The lateral coating may extend from back to front of the shoe upper all along the length of the shoe on the lateral side. This provides for support along the entire lateral side of the shoe.

The stiffness of the lateral portion may be between 1 and 20 times higher than the stiffness of the medial portion. This provide for a better support of the foot in cutting movements. In particular, the stiffness of the lateral portion may be between 1 and 10 times higher, and more particularly between 1.3 and 5.0 times higher than the stiffness of the medial portion. For example, the stiffness of the lateral portion may be between 1.8 and 3.0 higher at 30% strain than the stiffness of the medial portion.

The shoe upper may comprise at least one forefoot portion with a stiffness at least equal to the stiffness of the medial portion. Furthermore, the forefoot portion may comprise a vamp portion and a toe portion. The toe portion may cover the lower tip of the shoe upper. The width of the toe portion may be comprised between 5 mm and 30 mm from the sole. The vamp portion may have substantially the same stiffness as the medial portion (e.g. a ratio of 1). The stiffness of the toe portion may be between 0.4 and 1.4 the stiffness of the vamp portion, in particular between 0.6 and 1.2 the stiffness of the vamp portion, for example about 0.7 the stiffness of the vamp portion. Thereby, in some embodiments, the toe portion may be stiffer than the vamp portion, while in other embodiments the vamp portion may be stiffer than the toe portion.

Additionally, the medial portion may comprise a lower portion adapted to be placed along the sole and a higher portion between said lower portion and the intermediate portion. The stiffness of the lower portion and the stiffness in the higher portion may have the same stiffness ratio as the vamp portion and the toe portion. In particular, the stiffness of the lower portion of the medial portion may be the same as the stiffness of the toe portion. The stiffness of the higher portion of the medial portion may be the same as the stiffness of the vamp portion.

Additionally, the lateral portion may comprise a lower portion adapted to be placed along the sole and a higher portion between said lower portion and the intermediate portion. The stiffness of the lower portion and the stiffness in the higher portion may have the same stiffness ratio as the vamp portion and the toe portion. In particular the stiffness of the lower portion of the lateral portion may be the same as the stiffness of the toe portion. The stiffness of the higher portion of the lateral portion may be the same as the stiffness of the vamp portion.

Thereby a portion of the shoe upper may extend along the sole, e.g. from the front tip of the shoe and along the medial side and the lateral side with substantially the same stiffness. This portion may extend on the lateral side and/or on the medial side until a heel portion of the shoe upper. Such portion may provide support all around the shoe, and may provide a smoother transition from the sole's stiffness to the average upper's stiffness.

The shoe upper may comprise at least one forefoot coating applied to the forefoot portion of the shoe upper. Thus, stiffness of the forefoot portion is increased, the forefoot portion is reinforced and support of the foot is increased. A coating may also rigidify the shoe upper in the respective area, may provide waterproofing, may provide a better grip and/or may enhance the visual appearance of the shoe upper.

The shoe upper may comprise at least one heel portion comprising a coating applied to a base layer, adapted to modify the stiffness of the base layer. In this way, the stiffness of the heel portion is increased, the heel is reinforced, and support of the foot is increased. A coating may also rigidify the shoe upper in the respective area, may provide waterproofing, provide a better grip or enhance the visual appearance of the shoe upper.

The shoe upper may comprise at least one coating applied essentially to an entire base layer of the shoe upper except in the elastic intermediate portion. This provides for maximum support of the shoe, while the shoe may be easily put on and taken off due to the elastic intermediate portion. A coating may also rigidify the shoe upper in the respective area, may provide waterproofing, provide a better grip or enhance the visual appearance of the shoe upper.

In some embodiments the elastic intermediate portion may also comprise an elastic coating, with a function of, for example, waterproofing the elastic intermediate portion.

The shoe upper may comprise a knitted layer. Knitting allows the shoe upper to be manufactured essentially without any waste.

The knitted layer may be knitted in one piece and extend on at least 80% of the surface area of the shoe upper. Thus, additional manufacturing steps of assembling the shoe upper from separate pieces may be omitted.

Furthermore, certain functional areas may be provided during the knitting process by varying the knit structure in selected zones of the shoe upper. Thereby a continuous one-piece layer of the shoe upper is provided but with different functional areas, having different characteristics such as stiffness, breathability, etc.

The shoe upper may further comprise a first area having a first knit structure and a second area having a second knit structure different from the first knit structure. In this way, certain functions may be imparted to selected areas of the shoe upper. For example, over the vamp portion a rather open knit structure may be used to facilitate ventilation and grip on a ball, whereas the parts of the knitted shoe upper which are to be joined to the sole may comprise a very tight knit to improve the support of the foot, increase stability of the entire shoe and ensure a strong attachment to the sole.

The shoe upper may therefore comprise:
at least one layer of fabric, for example a knit layer with different knit structures, at least one continuous layer in one piece, for example the knit layer, a coating applied on at least one of the layers of the shoe upper, for example on the outer surface of the knit layer.

The shoe upper may additionally comprise at least one element of the following elements:
a stiffening element on the medial portion, for example on the outer side of the coated knit layer, a stiffening element on the lateral portion, for example on the inner side of the knit layer, a stiffening element in the forefoot portion, whether in the vamp portion and/or in the toe portion, or a comfort element in at least one area of the upper (for example foam paddings).

The knit layer of the shoe upper may be placed with the weft direction in a medial-lateral direction of the upper; therefore the warp direction may be in the longitudinal direction of the shoe upper.

The shoe upper may further comprise an elastic collar surrounding the shoe opening. Thus, putting the shoe on and off becomes more comfortable as the collar may stretch when the foot is inserted into the shoe. Furthermore, the elastic collar may provide fit around the foot, more specifically around the ankle portion, below, on, or above the ankle.

The stiffness of the collar may be between 0.2 and 3.0 times the stiffness of the elastic intermediate portion, in particular between 0.3 and 0.8 the stiffness of the elastic intermediate portion. These values particularly apply to strain values between 0% and 30% of the initial length of the material, at a third cycle testing of a non-used material.

The shoe upper may further comprise a holding tab proximate the junction between the elastic intermediate portion and a collar of the shoe. A holding tab allows to hold the shoe upper and in particular the U-throat portion while inserting or extracting the foot into or out of the shoe.

The shoe upper may further comprise at least one friction element in the shoe upper. In some embodiments, the shoe upper comprises a plurality of friction elements. In some embodiments, the friction element may be a rubber material applied to the shoe upper, for example some rubber dots applied to the material. The friction element may also comprise a rubber yarn or a rubber coated yarn. Such rubber may be of natural or synthetic origin, and may be replaced by other material that would increase the friction between the shoe upper and the skin or a sock of a user compared to the friction observed between the material of the shoe upper and the skin or the sock of a user. In some embodiments, the friction element may be placed on the inner face of the shoe upper, particularly on the inner face of the U-throat portion of the shoe upper. Such arrangement may increase friction during wearing of the shoe thereby ensuring a better fit and stability of the shoe during exercise. Also, such arrangement may provide haptic feedback and friction with the hand of a user, in particular when grasping the shoe upper to put the shoe on.

The stiffness of the lateral portion, the medial portion and the intermediate portion may be measured at an elongation of more than 5%. As mentioned before, the measurements of the stiffness are most accurate above 5% elongation.

The shoe upper may comprise additional layers on its outer surface or on its inner surface. For example, the shoe upper may comprise a support element. In particular, the shoe upper may comprise additional layers used for padding some areas, for containing the padding, and/or for adding stiffness to some areas, and/or for adding protection to some areas. At least one layer may be added on the inner side of at least part of the lateral portion to increase its stiffness. Similarly, at least one layer may be added on the inner surface of at least part of the medial portion to increase its stiffness. Such layer may be made of a different material than the other layers, in particular of a different material than a one-piece knit layer. The different layers may be glued and/or stitched together. Also at least one layer may be added to ensure protection of some areas such as a heel counter to provide stiffness and protection of the heel, a toe box to protect the tip of the foot, etc.

A further aspect of the present invention relates to a shoe, in particular an athletic shoe, comprising: (a.) a sole; and (b.) a shoe upper as described herein being attached to the sole.

The shoe may further comprise a sock arranged at least partially inside the shoe upper. The sock may ensure a better fit around the foot and improve the foot's stability. The sock may be attached to the shoe upper for example by stitching, gluing or welding. The sock may be attached to the shoe upper at the collar portion of the shoe upper, at a lateral and a medial side of a junction between the shoe upper and a sole, and at a forefoot portion of the shoe upper.

The internal sock may be adapted to cover at least a dorsal portion of a foot. In particular it may be adapted to cover a medial portion of a foot, and not the heel portion of the forefoot portion of a foot.

The internal sock may be knitted. The internal sock may more particularly be knitted with a very open structure, namely exhibiting holes.

The internal sock may comprise elastic yarns, such as elastane for example, to ensure a very low stiffness, and a high elasticity and recovery. This also provides for a better fit and compression of the foot.

The shoe may further comprise a shoe upper with a holding tab as described before, wherein a first end of the holding tab is attached to the shoe upper, and a second end of the holding tab is attached to the sock. This allows a wearer of the shoe to hold both the shoe upper and the sock while inserting the foot into the shoe, so that the shoe upper and the sock remain in a correct position.

The first end of the holding tab may be attached to the shoe upper at the top of the intermediate portion. This avoids folding of the upper area of the U-throat portion when the foot is inserted into the shoe, because the wearer may slightly lift the U-throat to facilitate inserting the foot into the shoe.

A still further aspect of the present invention relates to a method of manufacturing a shoe upper as described herein, comprising at least the steps of: (a.) forming the lateral portion; (b.) forming the medial portion; and (c.) forming the elastic intermediate portion, such that the stiffness of at least one of the lateral portion and the medial portion is at least two times higher than the stiffness of the elastic intermediate portion.

The method may further comprise the step of coating the lateral portion and/or the medial portion at least partially. In this way, the stiffness of the lateral and/or medial portion may be increased at targeted locations.

The lateral portion and/or the medial portion may comprise a fabric.

The method may further comprise the steps of: (a.) providing the fabric comprising a first surface and a second surface opposite the first surface; (b.) placing the fabric on a surface of a support structure, wherein the support structure is adapted to permit gas circulation through at least a portion of its surface and comprises at least a raised or embossed portion on its surface, and wherein the fabric is placed such that the first surface of the fabric faces the surface of the support structure and such that the fabric is arranged at least in part over the raised or embossed portion of the support structure; (c.) providing at least one coating comprising a first surface and a second surface opposite the first surface; (d.) placing the coating at least partially on the second surface of the fabric, such that the first surface of the coating faces the fabric; and (e.) applying a gas pressure differential between the second surface of the coating and the first surface of the fabric.

Thus, according to these method steps, a fabric is placed at least in part over a raised or embossed portion of a support structure. According to method step (d.) the coating is placed over the fabric and the fabric is placed at least in part over the raised or embossed portion of the support structure. The support structure is adapted to permit gas circulation through at least a portion of its surface. Thus, a gas pressure differential may be applied between the upper surface of the coating and the lower surface of the fabric.

To this effect, the fabric is placed on top of at least one of a plurality of holes in the surface of the support structure, in particular beneficially on top of a plurality of holes in the surface of the support structure, said holes being connected hydraulically to at least one vacuum pump.

In this way, a very good bonding is achieved between the coating and the fabric due to the pressure differential. Thus, the coating is not simply pressed against the fabric, but is additionally sucked into the fabric. The bonding obtained is therefore better as the coating may at least partially penetrate between the fabric's fibers. When the coating is applied to protect the fibers of the fabric, e.g. against water, this also permits to obtain a better protection of the fibers. This is in particular beneficial with thin-film coatings or liquid coatings. For example, a liquid coating may be sprayed on the fabric and may be sucked at least partially through the fabric, where it may dry. Also, when the fabric is not flat (for example some fabric may have a specific surface texturing with relief) a method according to some embodiments permits a coating to be obtained which conforms to the surface texturing of the fabric.

The fabric is beneficially breathable in the sense that it allows the passage of gas, at least when a pressure differential is applied across the thickness of the fabric.

The fabric may be a knitted fabric. The usage of knitted fabric is beneficial in the context of the present invention as it permits a good passage of gas due to its open mesh structure.

The method may further comprise the step of placing a draping membrane on the fabric and the coating before the pressure differential is applied. The draping membrane may additionally apply pressure to the coating and the fabric to improve the bonding. Furthermore, the draping membrane may help to maintain the coating on the fabric before bonding.

The method may further comprise the step of heating the coating. Heat may further improve the bonding between the coating and the fabric. Heat may be applied in different ways. For example, the support structure (e.g. its surface) may be heated, whereby heat is transferred to the fabric and the coating. Heat may be applied directly to the coating, e.g. by infrared light. If used, heat may be applied through the draping membrane. For example, the draping membrane may be transparent to infrared light or microwaves.

The step of heating the coating may be performed at least partly simultaneously with the step of applying a gas pressure differential. Thus, heat is applied while the coating is in firm contact with the fabric which leads to a very good bonding between the coating and the fabric.

The coating may be a waterproofing coating. Alternatively or in combination, the coating may be a drag-lowering coating. This may be achieved either by the material of the coating and/or by its surface texturing. Such a coating may be decorative or may be associated with a decorative coating. The coating may also improve resistance to abrasion, strain and/or wear. Alternatively or additionally, the coating may add strength, rigidity and/or elasticity to the fabric. Furthermore, the coating may improve the grip provided by the fabric. This is in particular beneficial if the fabric is used in a shoe upper, such as e.g. for a soccer shoe.

The coating may in particular be suited to ensure the function of maintaining the three-dimensional shape of the fabric once it is taken from the support structure after the method has been performed according to some embodiments. To this end, the coating may in some embodiments be at least partially placed over the raised or embossed portion of the support structure. In this way, the coating conforms to the shape of the raised or embossed portion at least in part and causes the fabric to maintain that shape as well once the coating is cured.

The coating may be a thermoplastic coating. Thermoplastic coatings are applied to the fabric by heat transfer and achieve a very good bonding to the fabric. Also, in case of a fabric with openings (such as those formed by meshes of e.g. a knitted fabric), a thermoplastic coating (e.g. which may be relatively thin) may melt and penetrate the yarns, but preserve the openings and air permeability of the fabric.

The coating may be a film. A film may be exactly placed on the fabric either by hand or by an automatic feeder (e.g. a robot arm). Thus, using a film coating with the method of certain embodiments achieves a very precise positioning of the coating on the fabric.

The coating may comprise a surface structure before being placed on the fabric. For example, the coating may comprise a small embossing and/or debossing. The surface structure may have the shape of dots, pyramids or lines. A surface structure may beneficially increase the grip of the shoe upper for example on a ball.

The coating may have a thickness between 0.02 mm and 3 mm. In particular, the thickness may be between 0.1 mm and 1.5 m and more beneficially between 0.2 mm and 1 mm, for example 0.3 mm.

The coating may be a thermoplastic coating. In particular, the coating may be a polyurethane. Alternatively or in combination, the coating may comprise a plurality of layers, such as e.g. a layer of a thermoset chosen for the functionality it brings to the fabric, and a layer of a thermoplastic chosen for its ability to bond with the fabric under pressure differential and heat application.

The step of providing at least one coating may comprise providing a plurality of coatings and the steps of placing the at least one coating may comprise placing the plurality of coatings. The coatings of the plurality of coatings may be of the same or different shape. For example, a first coating may have a mirror-inverted shape of a second coating, where the first coating is applied to a right side of the fabric, whereas the second coating is applied to the left side of the fabric.

The coatings of the plurality of coatings may be of the same or of a different material, may have the same or a different thickness, and may have the same or different colors. The coatings of the plurality of coatings may coincide, overlap, or be separated from each other. Furthermore, it is possible that at least one coating is placed above the fabric according to method step (d.) and at least one further coating is placed under the fabric. Thus, the fabric may be coated from both sides.

The coating may be a polymer with a hardness in the range of 40-80 Shore A, and in some embodiments with a hardness in the range of 50-70 Shore A, and in some embodiments, with a hardness of 60 Shore A.

The raised or embossed portion of the support structure may correspond to an ankle portion and a top portion of a dorsal part of a last. Thus, a portion of the shoe or shoe upper may be formed to a three-dimensional shape by this method.

If the support structure comprises a raised portion, the raised portion may correspond to a top portion of a dorsal part of a last. In this case, the support structure may be flat around the raised portion. This provides for easier manufacturing and better accuracy when positioning elements on the support structure.

However, the raised or embossed portion of the support structure may correspond to a portion of a last but may also have some differences with the corresponding portion of the last used in a later step of assembling and shaping the shoe.

In case of a raised portion, the raised portion may correspond to at least a part of the instep portion of a last. The size and/or shape of the raised portion may be varied to form shoe uppers with different sizes and/or shapes. This may help to better fit the shoe uppers to the different feet of wearers of the shoes. In particular, the raised portion may be customized to the foot of a wearer. The customization may be based on foot data e.g. obtained by 3-D scanning.

The support structure may have the shape of a shoe last. Thus, a shoe upper comprising a fabric may be exactly formed to the shape of the last when coating the fabric. The coating then conforms to the actual shape of the last, and at least partially maintains the fabric to the shape of the last after it is released from the support structure. In such case, the last may comprises at least one hole—and in some embodiments, a plurality of holes—on its surface which are connected hydraulically to at least one low pressure source. To this effect, at least one air channel may be formed inside the last.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Figure 1B:
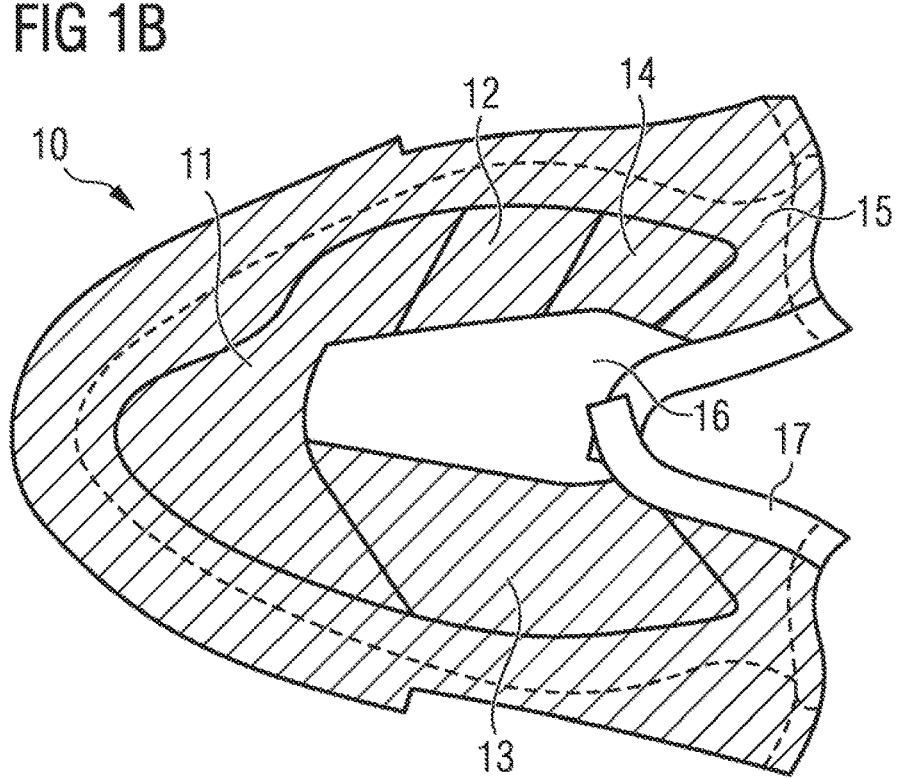
FIG. 1B is a top view of a coating layout of the knitted upper according to FIG. 1A.

An example of a base layer of a shoe upper according to some embodiments is described with reference to FIGS. 1A and 1B. FIG. 1A shows an example of a knit structure of a base layer of a shoe upper 10 which is knitted, whereas FIG. 1B shows the corresponding coating layout of the layer of a shoe upper 10. The shoe upper 10 may be knitted on a conventional knitting machine and may be based on a flat or circular knit. However, it should be noted that the present invention is not restricted to knitted shoe uppers and that the shoe upper 10 may be made from other materials, such as woven fabrics, non-woven fabrics, meshes, etc. as well. Also, while the shoe upper shown in FIGS. 1A and 1B is a one-piece knit, in general, the shoe upper 10 may be made from several pieces which are joined e.g. by gluing, stitching or welding.

The knit layer shown in FIG. 1A is a continuous one-piece knit layer comprising different knit structures in different areas.

The vamp portion 11 shown in FIG. 1A is based on a very open knit structure with holes. The medial portion 12 is based on an open knit structure (70%) and comprises holes of smaller size than the vamp portion 11. It is based on a transfer stitch.

The lateral portion 13 is based on a medium open knit structure. It is based on transfer stitch as well. The medial portion 14 is based on a medium open knit structure. It is based on transfer stitch as well. The portion 15 connecting the shoe upper 10 to a sole of a shoe is based on a tight knit structure. In this way, the stability of the upper may be increased as the comparably stiff and inelastic tight knit portion 15 of the shoe upper may be directly joined to the sole (e.g. by gluing, stitching or welding) and provides support all around the foot. The portion 15 is based on a tuck stitch.

The intermediate (or dorsal, or U-throat) portion 16 is a tight knit structure based on a tuck stitch as well.

In some embodiments, for example, as shown in FIGS. 1A and 1B, the layer of a shoe upper 10 includes at least two medial portions 12 and 14. A part of the vamp portion 11 may be considered as a medial portion as well. Likewise, the vamp portion 11 may extend to the lateral side of the shoe upper 10, such that a part of the vamp portion 11 may be considered as a lateral portion. In any case, the intermediate portion 16 is arranged between at least one medial portion and at least one lateral portion.

In some embodiments, such as in FIGS. 1A and 1B, different yarns may be used. If, for example only PES yarns are to be used, the yarns in the dorsal throat portion 15 may be based on 90.8% polyester and 9.2% spandex for example. If, however, yarns with additional nylon are used, the composition of the yarns may for example be 87.5% polyester, 3.3% nylon and 9.2% spandex.

Finally, the collar portion 17 is based on a collar rib made with a tuck stitch. This makes the collar portion 17 rather elastic to facilitate insertion of the foot. In some embodiments, as may be appreciated with reference to FIGS. 1A and 1B, different yarns may be used for that portion as well. If, for example only PES yarns are to be used, the yarns in the collar portion 16 may be based on 64.4% polyester and 35.6% spandex for example. If, however, yarns with additional nylon are used, the composition of the yarns may for example be 51.7% polyester, 12.7% nylon and 35.6% spandex.

In some embodiments, such as shown in FIGS. 1A and 1B, the size (i.e. the linear mass density) of the yarns may be 840 Deniers. However, yarns of different sizes may be used in different embodiments. Also, it is to be noted that the arrangement of portions, knit structures and composition of yarns described above is only by way of example. Accordingly, different arrangements of portions, different knit structures and different yarns may be used in the context of the present invention.

FIG. 1B shows the layout of a coating which is applied to the knitted upper of FIG. 1A. As shown in FIG. 1B, the coating is applied to the portions 11 to 15. The coating is not applied to the intermediate (or dorsal, or U-throat) portion 16 to maintain the elasticity of this portion. Furthermore, the coating is not applied to the collar portion 17 to maintain its elasticity as well.

Applying the coating to the portions 11 to 15 permits stiffness to be increased for the lateral, medial, and forefoot portions. The coating may be applied as will be further described below. In addition to reducing elasticity of the knit, the coating may also impart waterproofing, grip or other properties to the knit.

Additionally or alternatively to a coating, pieces of coating may be applied to the knitted upper 10. Such pieces of coating may be applied to the coating (on top or below) or directly to the knit layer. Such pieces of coating may also be applied to modify the stiffness of the knit layer.

Figure 2A:
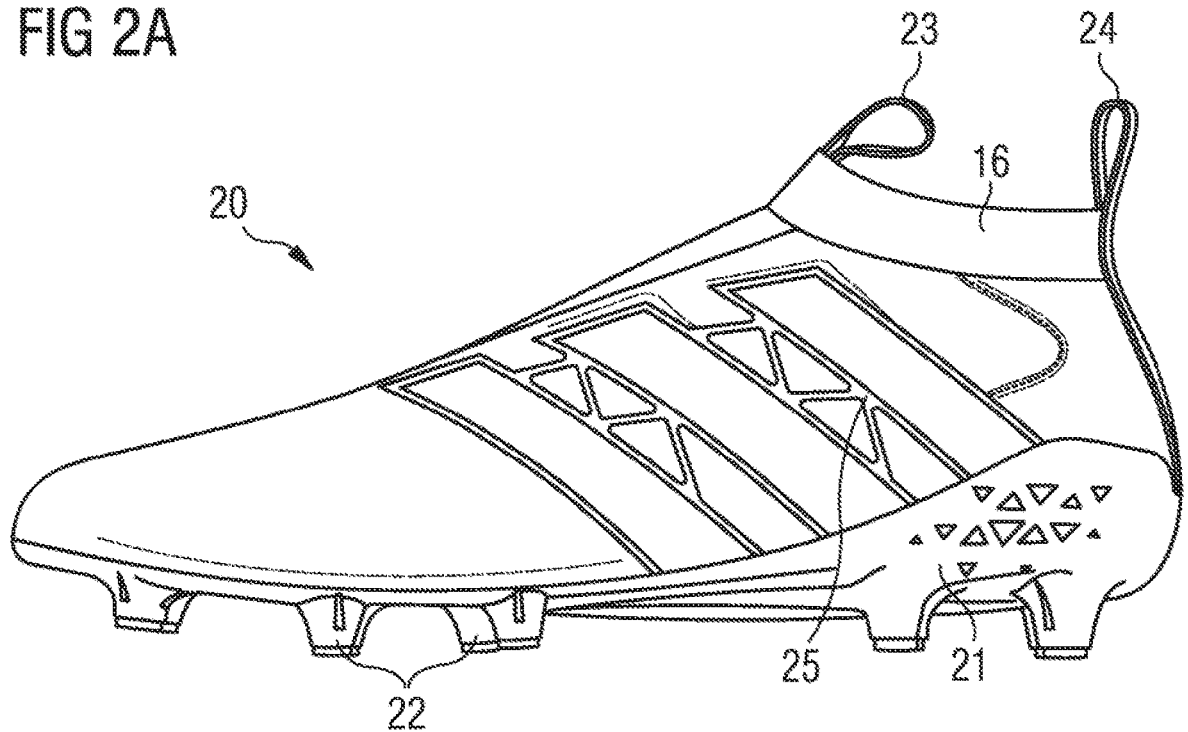
FIG. 2A is a lateral view of a shoe, according to certain embodiments of the present invention.
Figure 2B:
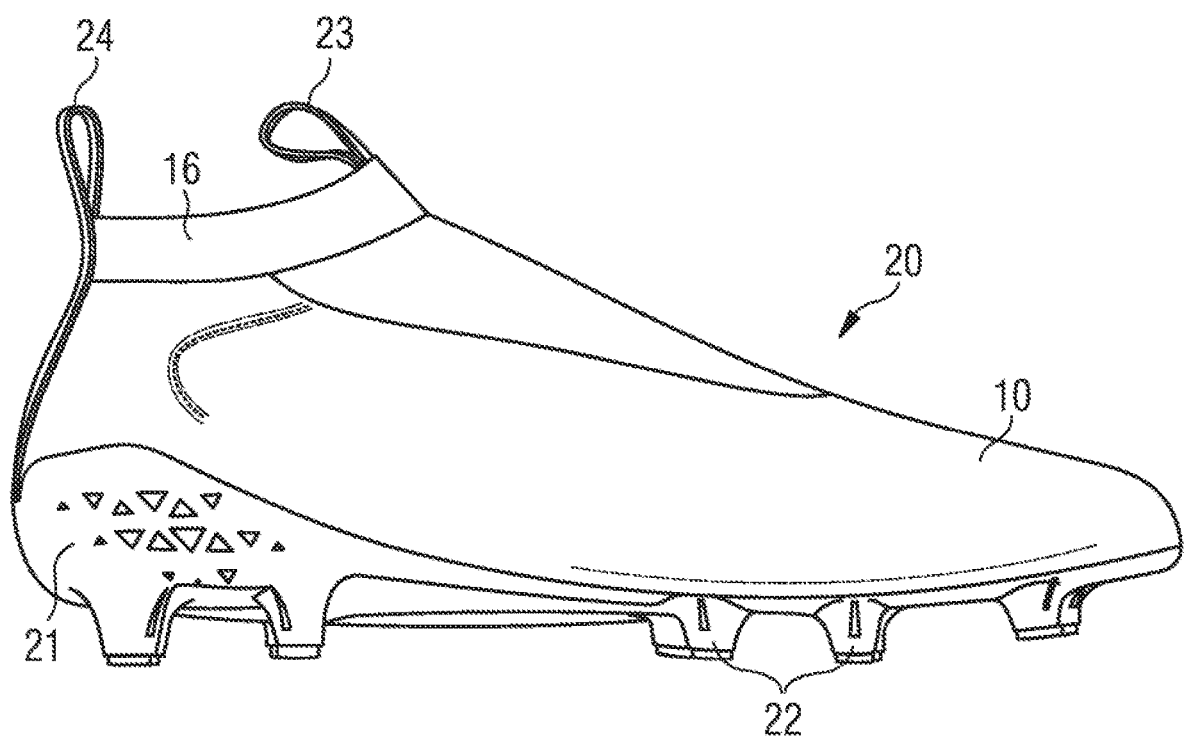
FIG. 2B is a medial view of a shoe, according to certain embodiments of the present invention.

FIGS. 2A and 2B show an example of a shoe 20 according to some embodiments. FIG. 2A shows a lateral view of the shoe 20, whereas FIG. 2B shows a medial view of the shoe 20. The shoe 20 comprises a shoe upper comprising a layer similar to the layer of a shoe upper 10 as described above with respect to FIGS. 1A and 1B. In addition, the shoe 20 comprises a sole 21 which is joined to the shoe upper 10. The sole 21 may be joined to the shoe upper 10 for example by stitching, gluing or welding.

The sole 21 comprises cleats, two of which are denoted by way of example by the reference numeral 22. Accordingly, FIGS. 2A and 2B show a soccer shoe. However, it should be noted, that the present invention may be applied to any kind of shoes, in particular any kind of athletic shoes. Examples include football shoes, rugby shoes, tennis shoes, basketball boots, etc.

As shown in FIGS. 2A and 2B, the shoe upper 10 comprises a support element 25 on the lateral side. This support element 25 adds stiffness to the lateral side of the upper, thereby making the lateral portion 13 of the upper stiffer than the medial portion 14 and the vamp portion 11.

The support element is for example a thermoplastic material. Its thickness is for example between 0.1 mm and 3 mm, for example about 1 mm. It may be bonded by heat on top of the coating.

Figure 9:
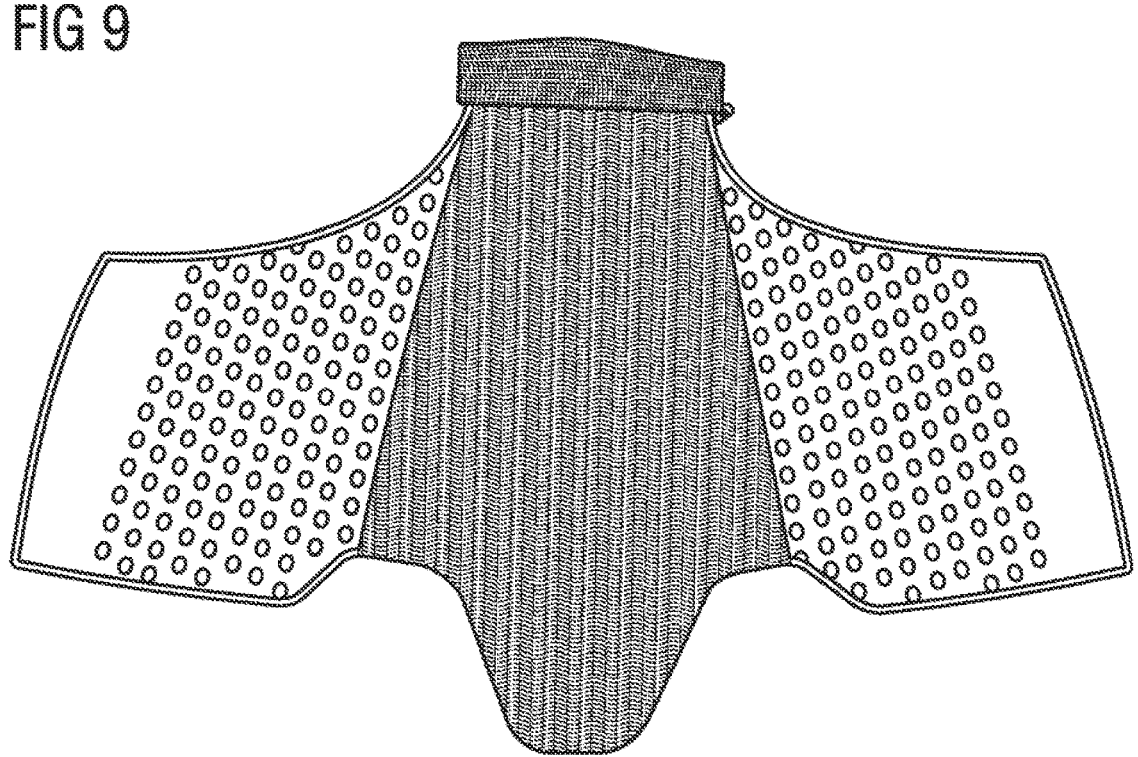
FIG. 9 shows a sock for a shoe upper, according to certain embodiments of the present invention.

As shown in FIGS. 2A and 2B, the shoe upper 10 may include a holding tab 23. The holding tab 23 is shown arranged proximate the junction between the elastic intermediate portion 16 and the collar portion 17 of the shoe upper 10. The holding tab 23 allows the U-throat to be held while inserting or extracting the foot into or out of the shoe 20. To this end, a first end of the holding tab 23 is attached to the shoe upper 10 at the top of the dorsal portion 15. A second end of the holding tab 23 is attached to a sock (not shown in FIGS. 2A and 2B) which is arranged inside the shoe upper 10. The sock is attached (e.g. by gluing, sewing or welding) to the shoe upper 10 at the collar portion 17 of the shoe upper 10. An example of a layer for a sock is shown in FIG. 9.

In some embodiments, as may be appreciated with reference to FIGS. 2A and 2B, the shoe upper 10 also comprises a holding tab 24 arranged in the heel portion of the shoe upper 10. The holding tab 24 facilitates putting on or taking off the shoe 20.

Measurements have been made on a shoe upper 10 on a shoe according to some embodiments. The following table shows the local maximum strain values of the shoe portions in the second to fifth columns during the movements listed in the first column:

TABLE 1

| activity | U-throat | medial portion | lateral portion | forefoot |
|---|---|---|---|---|
| standing | 40% | 20% | 15% | 15% |
| straight sprinting | 15% | 10% | 10% | 15% |
| cutting movement | 20% | 10% | 10% | 10% |

The strain of the activity "straight sprinting" and of the activity "cutting movement" is the additional strain compared to the "standing" activity.

More particularly, the following local maximum strain values have been found when measuring a shoe upper 10 on a shoe according to some embodiments:

TABLE 2

| activity | U-throat | medial side | lateral side | forefoot |
|---|---|---|---|---|
| standing | 30% | 10% | 10% | 10% |
| straight sprinting | 10% | 5% | 5% | 10% |
| cutting movement | 15% | 5% | 5% | 5% |

An example of a method of manufacturing a shoe upper comprising a fabric according to certain embodiments is now described with respect to FIGS. 3A, 3B, 3C, 3D and 3E. The method comprises a first step (a.) of providing a fabric 30 comprising a first surface and a second surface opposite the first surface. In the example of FIGS. 3A, 3B, 3C, 3D and 3E the fabric 30 has the shape of a shoe upper for a shoe. Thus, in this example, the shoe upper is made from the fabric 30 in one piece. However, in some embodiments, the shoe upper is partly made from the fabric 30 and may comprise other materials, e.g. woven fabrics, non-woven fabrics, meshes, etc. as well.

The shoe upper may also comprise additional layers on its outer surface, like the support element 25, or on its inner surface. In particular, additional layers may be used for padding some areas, for containing the padding, and/or for adding stiffness to some areas, and/or for adding protection to some areas. For example at least one layer may be added on the inner side of at least part of the lateral portion to increase its stiffness. Similarly, at least one layer may be added on the inner surface of at least part of the medial portion to increase its stiffness. Such layer may be made of a different material than the other layers, in particular of a different material than a one-piece knit layer. The different layers may be glued and/or stitched together. Also at least one layer may be added to ensure protection of some areas such as a heel counter to provide stiffness and protection of the heel, a toe box to protect the tip of the foot, etc.

Figure 10:
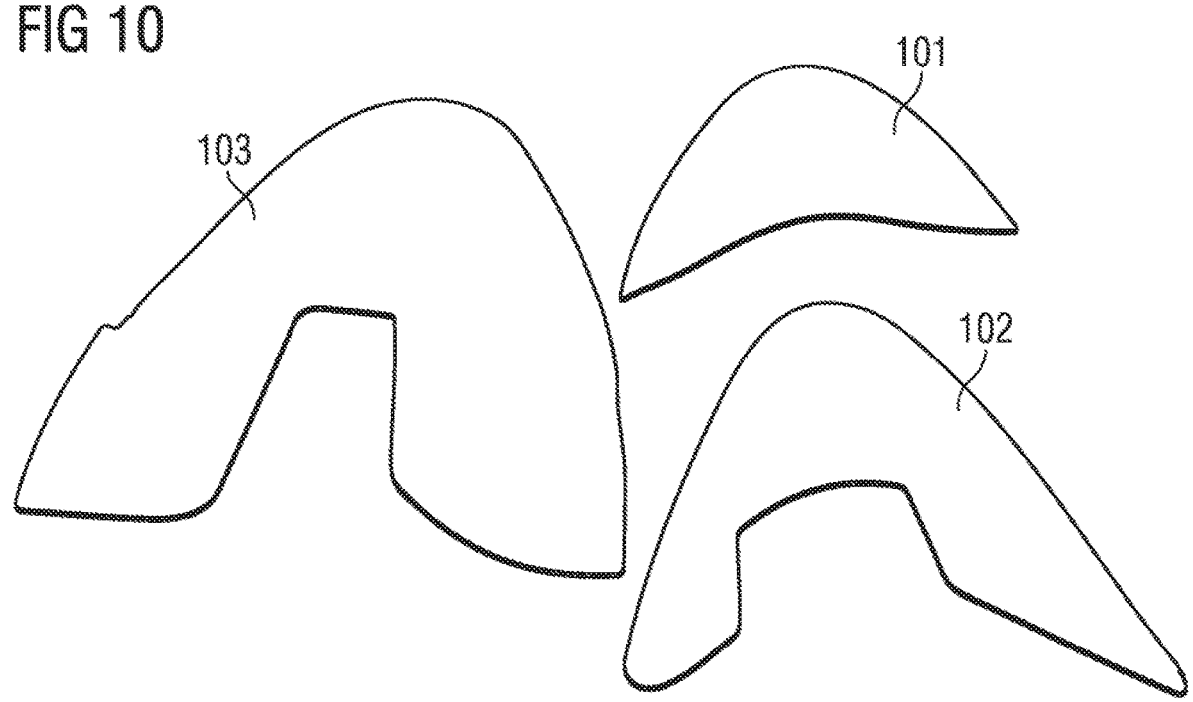
FIG. 10 illustrates internal layers of a forefoot portion of a shoe upper, according to certain embodiments of the present invention.

For example, in FIG. 10, internal layers of a forefoot portion are represented. In order from the base layer to the internal space of the shoe, there is a toe box 101, a toe padding and a lining. These elements are attached to the base layer, for example by gluing and/or stitching.

The toe box 101 is represented at the top right side of FIG. 10. The toe box 101 is made to reinforce the tip of the shoe upper so as to better protect the foot from impacts. The toe box may also in some embodiments stiffen this portion of the shoe upper.

The toe padding 102 is a piece of foamed material and is represented at the bottom right side of FIG. 10. The toe padding 102 is adapted to protect the foot from impacts.

On the left side of FIG. 10 an internal lining 103 is represented. The internal lining 103 is made to contain the toe padding 102 and protect the toe padding 102 from friction with the foot, as well as to improve the comfort of the wearer. The internal lining 103 may in some embodiments stiffen this portion of the shoe upper.

Figure 11:
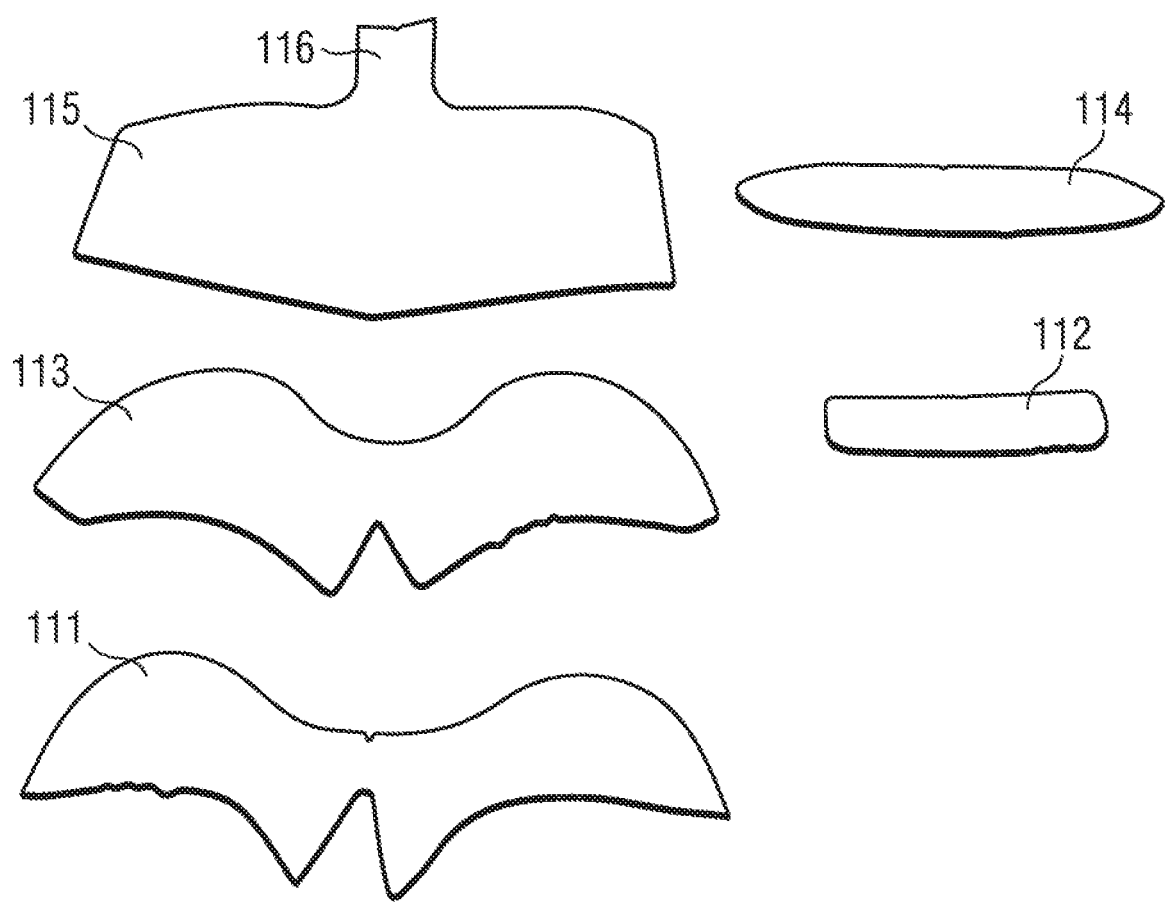
FIG. 11 illustrates internal layers of a heel portion of a shoe upper, according to certain embodiments of the present invention.

In FIG. 11 internal layers of a heel portion are represented. In order from the base layer to the internal space of the shoe, there is a hot melt layer 111, a first heel padding 112, a heel envelope 113, a second heel padding 114 and an internal lining 115.

The hot melt layer 111 is represented at the bottom left of FIG. 11. The hot melt layer 111 is adapted to attach the first heel padding 112 and the heel envelope 113 to the base layer of the shoe upper. The hot melt layer 111 may in some embodiments stiffen this portion of the shoe upper. Thus, the hot melt layer 111 may act as a heel counter.

The first heel padding 112 is a piece of foamed material and is represented on the right side of FIG. 11 below the second heel padding 114. The heel padding 112 is arranged between the hot melt layer 111 and the heel envelope 113. The heel paddings 112 and 114 are adapted to protect the foot from impacts.

The heel envelope 113 is represented in the middle part of the left side of FIG. 11. The heel envelope 113 protects the heel paddings 112 and 114 from friction with the foot. The heel envelope 113 may in some embodiments stiffen this portion of the shoe upper. In particular, the heel envelope 113 may reinforce the hot melt layer 111.

The second heel padding 114 is a piece of foamed material and is represented on the right side of FIG. 11 above the first heel padding 112. The heel padding 114 is arranged between the heel envelope 113 and the internal lining 115. The heel paddings 112 and 114 are adapted to protect the foot from impacts.

On the top left side of FIG. 11 an internal lining 115 is represented. The internal lining 115 is made to contain the heel paddings 112, 114 and the heel envelope 113 and to improve the comfort of the wearer. The internal lining 115 also comprises a tongue 116 adapted to be attached, e.g. stitched, with the holding tab 24. The internal lining 115 is also in some embodiments stitched to an internal sock (such as for example the sock shown in FIG. 9). The internal lining 115 is in some embodiments glued and/or stitched to the base layer. The internal lining 115 may in some embodiments stiffen this portion of the shoe upper.

In the example of FIGS. 3A, 3B, 3C, 3D and 3E, the fabric 30 is a knitted fabric. The knitted fabric 30 could be weft-knitted or warp-knitted and may be manufactured on a suitable knitting machine. Also, the knitted fabric could be flat knitted or circular knitted. It should be noted, however, that the invention is not limited to knitted fabrics and the shoe upper could comprise fabrics like woven or non-woven fabrics, meshes, etc. as well.

The method comprises the step (b.) of placing the fabric on a surface 32 of a support structure 31. In the example of FIGS. 3A, 3B, 3C, 3D and 3E the support structure 31 comprises a flat table with a raised portion 33 on its surface 32 (see FIG. 3A). An embossed portion could be used as well.

Figure 3A:
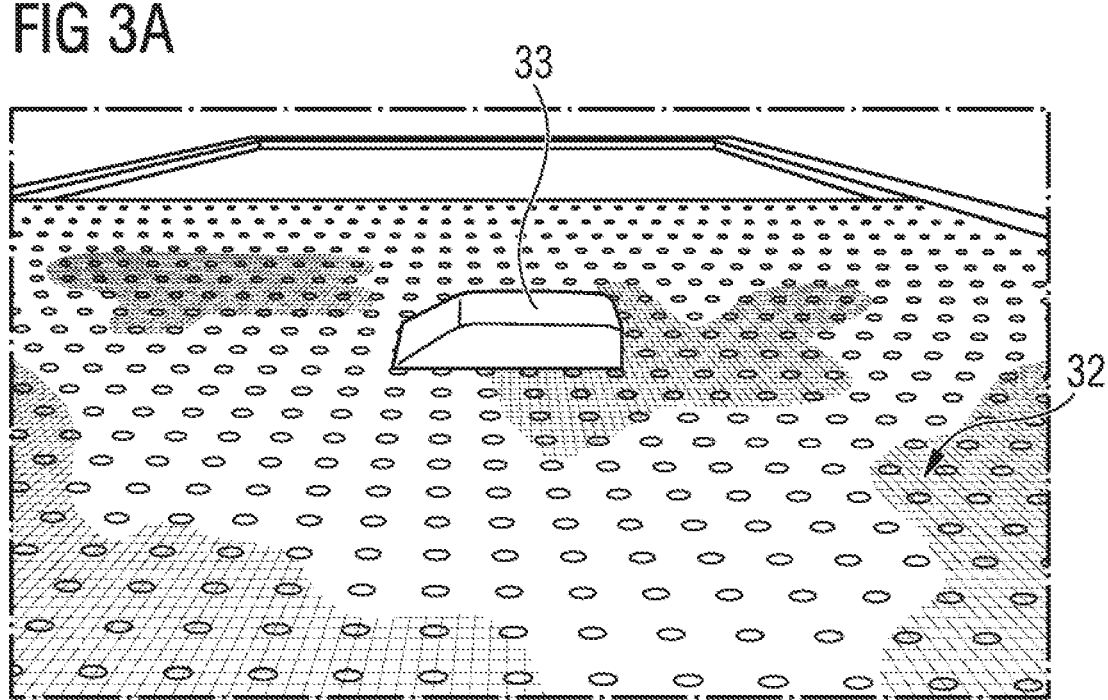
FIGS. 3A, 3B, 3C, 3D and 3E illustrate a method of coating a shoe upper, according to certain embodiments of the present invention.

In some embodiments, as may be seen in FIG. 3A, the raised portion 33 is a modular piece which is arranged on the surface 32 of the support structure 31. Thus, the raised portion 33 may easily be exchanged for example with a raised portion 33 having a different size and/or shape. In this way, the raised portion 33 may be adapted for manufacturing shoe uppers or shoes of different sizes. In other embodiments, however, the raised portion 33 may be integral with the surface 32 of the support structure 31.

The fabric 30 comprises a first, lower surface facing a support structure 31, and a second, upper surface facing away from the support structure 31.

The support structure 31 is adapted to permit gas circulation through at least a portion of its surface 32. Gas circulation could for example be achieved by perforations in the surface 32. The gas may be ambient air.

The fabric 30 is placed such that the first surface of the fabric faces the surface 32 of the support structure 31 and such that the fabric 30 is arranged at least in part over the raised portion 33 of the support structure 31. In the example of FIGS. 3A, 3B, 3C, 3D and 3E a part of the intermediate (or dorsal portion, or instep portion, or U-throat) of the shoe upper is placed over the raised portion 33. Accordingly, the raised portion 33 has the shape of an instep of a last. In different embodiments it is possible that the raised portion 33 corresponds to an ankle portion and/or to a top portion of a dorsal part of a last. In different embodiments the support structure 31 or a part thereof may have the shape of a shoe last.

The method comprises a step (c.) of providing at least one coating 34 comprising a first surface and a second surface opposite the first surface. In some embodiments, such as shown in FIGS. 3A, 3B, 3C, 3D and 3E, the coating 34 is a thin film of a polymer material, e.g. PU. The coating's material for example has a hardness in the range of 40-80 Shore A. Other materials could be used as well for the coating 34. In some embodiments, the film has a thickness of about 0.3 mm. In other embodiments, it is possible to apply a liquid coating for example by spraying or painting.

The method comprises a step (d.) of placing the coating 34 at least partially on the second surface of the fabric 30, such that the first surface of the coating 34 faces the fabric 30. Thus, in this method step the coating 34 is arranged above the fabric 30.

Figure 3B:
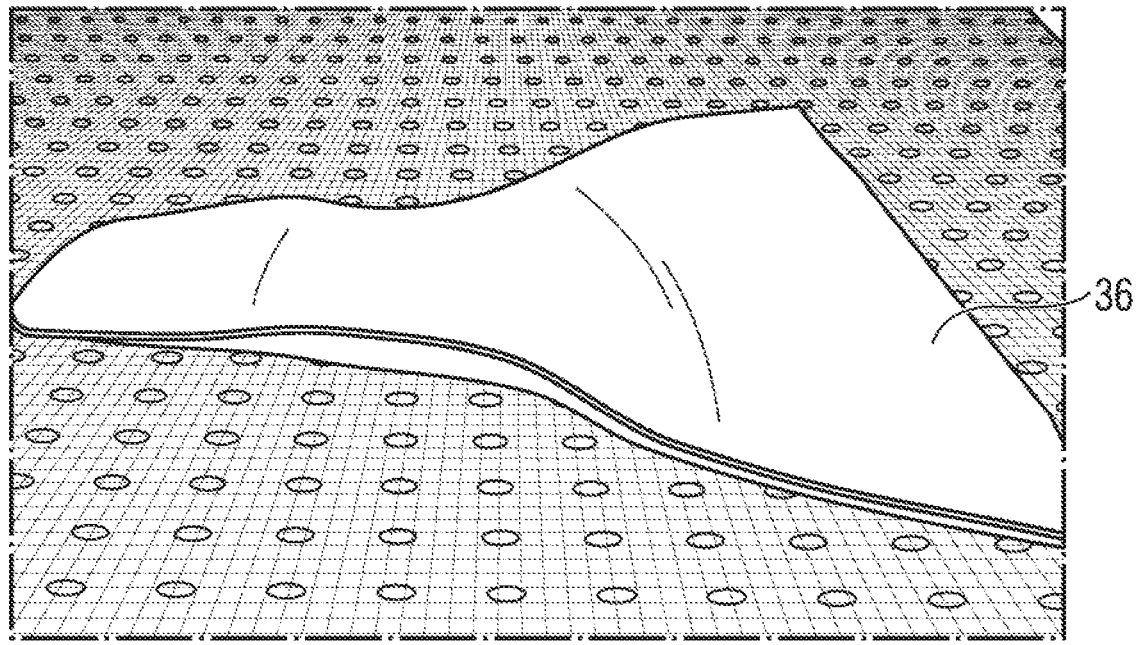
Figure 3C:
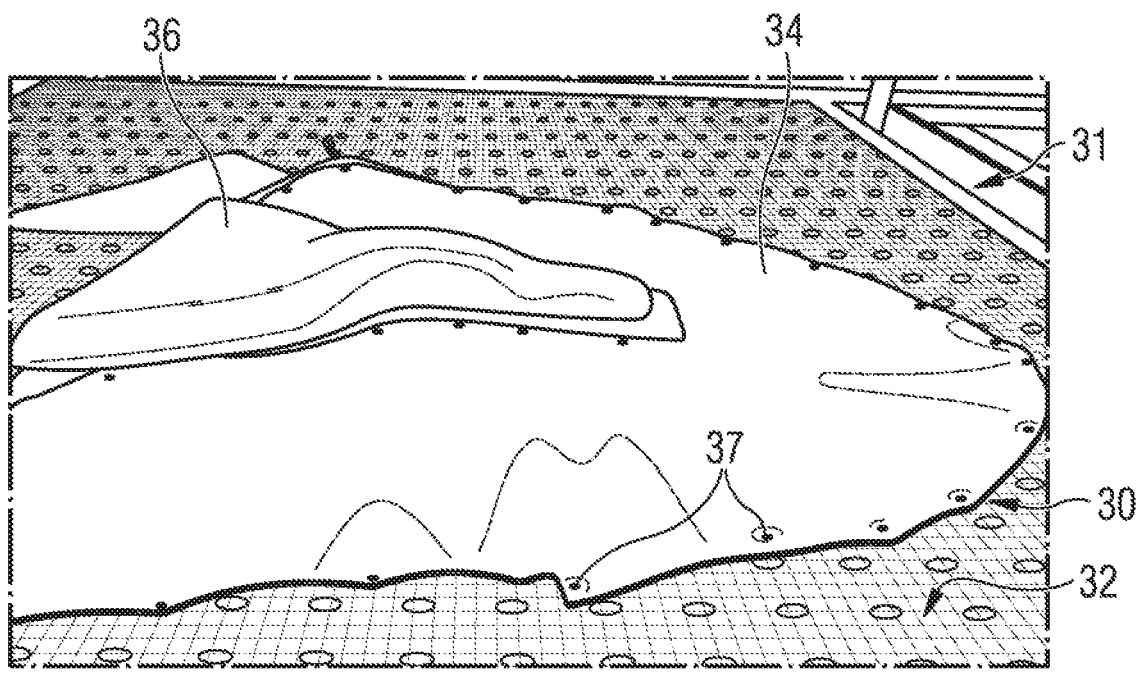

In the example of FIGS. 3A, 3B, 3C, 3D and 3E an optional step is shown, namely the placing of a shell (or female mold) 36 over the fabric 30 and optionally partially over the coating 34 (see FIG. 3C). As shown in FIG. 3B, the shell 36 has a shape which is adapted to engage with the shape of the raised portion 33. Thus, the fabric 30 and the coating 34 arranged on top of the fabric 30 are firmly held in place for the subsequent method step and both are very well conformed to the shape of the raised portion 33. Furthermore, the shell 36 protects the U-throat area from the heat which may be used to apply the coating to the fabric as will be described below, as most fabrics (including knitted fabrics) will degrade under heat. Therefore, the shell 36 may comprise a heat insulation layer which reflects IR radiation. Furthermore, the shell 36 may cover the entire U-throat area to avoid degradation of the fabric at locations where no coating is applied.

The method comprises a step (e.) of applying a gas pressure differential between the second surface of the coating 34 and the first surface of the fabric 30. To this end the support structure 31 could be connected to a vacuum source such as a pump to evacuate ambient air through perforations in the surface 32 of the support structure 31. In this way a pressure differential is obtained between the upper surface of the coating 34 and the lower surface of the fabric 30.

It should be noted that instead of a single coating 34, a plurality of coatings could be placed on the fabric 30. The coatings may coincide, overlap or be separate from each other. Also, the coatings may vary in size, shape, and/or thickness. Coatings may differ in the material used and/or in the state of the material. For example, one coating may be a thin polymer film, whereas another coating may be a liquid polymer.

Figure 3D:
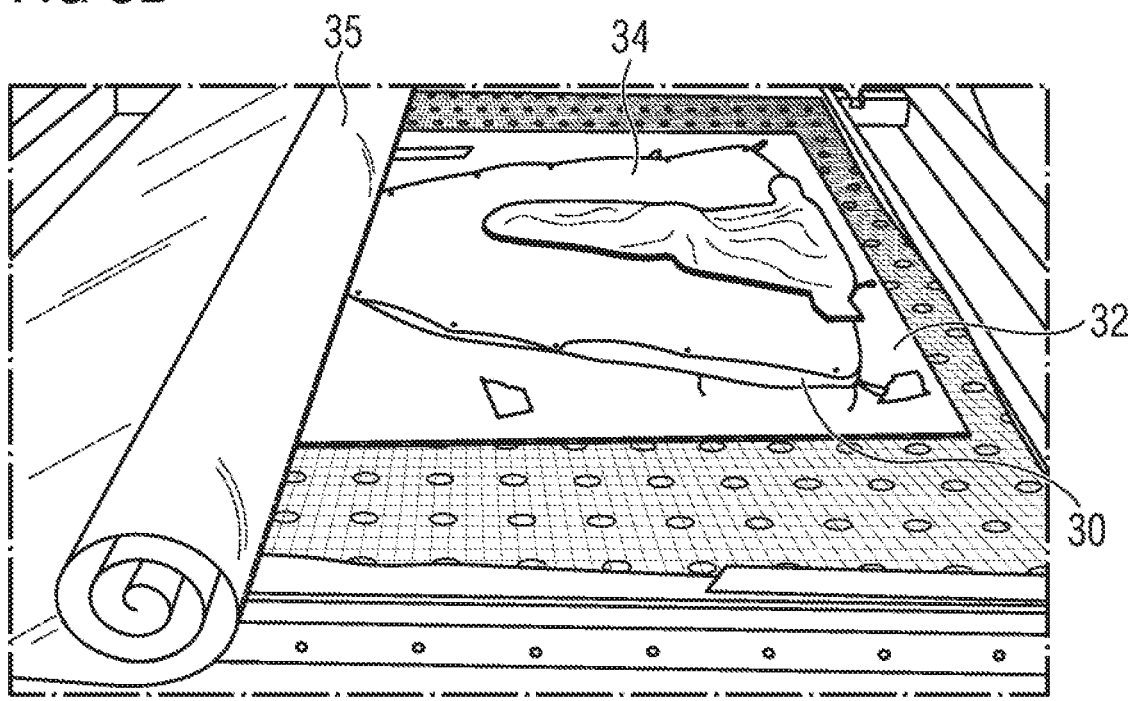
Figure 3E:
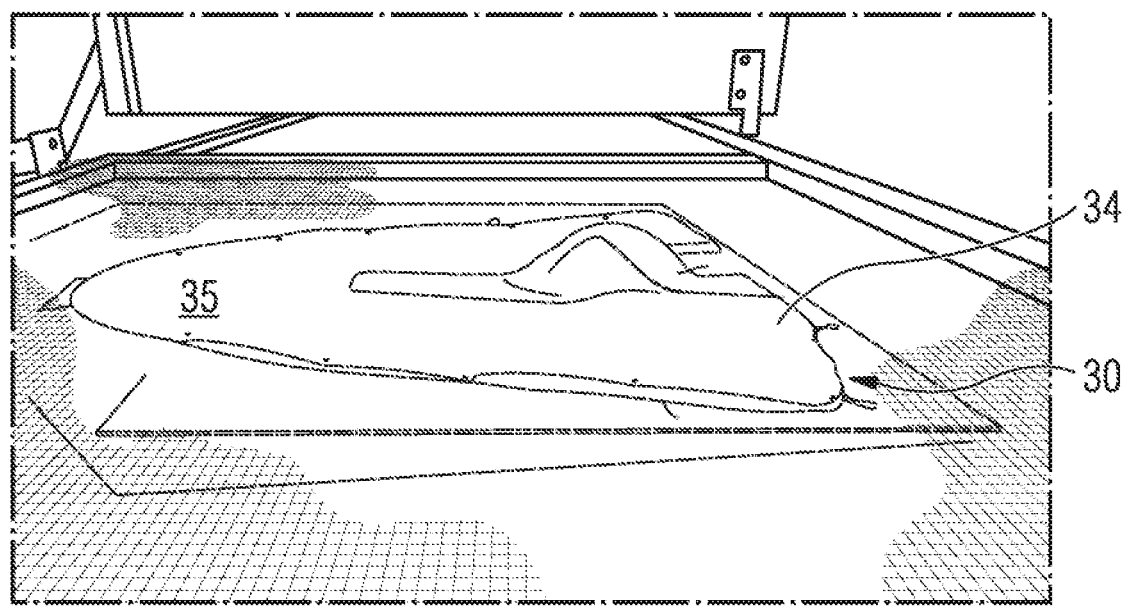

In the example of FIGS. 3A, 3B, 3C, 3D and 3E a gas proof draping membrane 35 (see in particular FIG. 3D) is additionally used to increase the pressure on the coating 34 and the fabric 30. As shown in FIG. 3D, after the coating 34 and the optional shell 36 have been placed on the fabric 30, the draping membrane 35 is placed over the coating 34 and the fabric 30. When the pressure differential is applied the ambient air between the fabric 30 with the coating 34 and the draping membrane 35 is evacuated and the draping membrane 35 is firmly pressed against the coating 34 and the fabric 30 by the vacuum as shown in FIG. 3E. It should be noted that the draping membrane 35 is optional just like the shell 36.

If a liquid coating or a solid thin film of coating is used, it is sucked through the mesh structure of the fabric 30 by the pressure differential and dries to create a firm bond with the mesh structure.

To improve the bonding between the coating 34 and the fabric 30, the method may further comprise the step of heating the coating 34. Heat may be applied for example by heating the support structure 31 and/or by heating a draping membrane 35 if present. If the heating membrane 35 is made from a transparent material, infrared radiation or microwaves could be used to heat the coating 34. Furthermore, the support structure could be heated. To increase the bonding, heat should be applied simultaneously with the pressure differential.

The coating 34 applied to the shoe upper provides for a stiffness of the lateral portion and/or the medial portion of the shoe upper, which is at least two times higher than the stiffness of the elastic intermediate portion. However, the coating 34 could impart other properties as well. Accordingly, the coating 34 may be a waterproofing coating and/or a stain-resistant coating. The coating 34 could also be decorative or could be associated with a decorative coating. Furthermore, the coating 34 may be a drag-lowering coating. This may be achieved either by the material of the coating and/or by its surface texturing. Such a coating may be decorative or may be associated with a decorative coating.

The method according to certain embodiments allows use of a coating film in one piece and ensures that it is perfectly placed on a three-dimensional article such as the shoe upper 10. To build upon the example above, if the coating 34 had been applied to the shoe upper on a flat surface instead of an embossed surface, the opening of the shoe may not have been wide enough, i.e. the opening of the final shoe would be too narrow to introduce a foot in the shoe; besides the coating 34 may tear when putting on the shoe. Also in this example, if the coating was applied with the upper on a completely flat surface, the U-throat would not have a shape conforming to a foot, and it may even wrinkle during the coating application. Placing the fabric 30 over the raised portion 33 of the support structure 31 ensures that the fabric 30 takes the right shape and forms a sufficiently wide opening when used as a shoe upper.

FIG. 4 shows a flowchart of method steps according to an example of a method of the invention for manufacturing a shoe upper 10. In method step 41 a fabric is placed on a surface of a support structure. The fabric in this example may be a knitted fabric. The support structure in this example comprises a raised portion. The fabric is placed on the surface of the support structure with an area of the fabric adapted to form a tongue area (or U-throat) of a shoe upper arranged over the raised portion of said support structure.

In method step 42 at least one coating is placed on the fabric. The coating may for example be a polyurethane film with a thickness of 0.3 mm. In an optional step (not shown in FIG. 4), the coating may be pre-positioned on the fabric with an ultrasonic welding machine. To this end, the coating may be temporarily fixed to the fabric at a number of weld points, for example 14 weld points. Two of those optional welding points are denoted in FIG. 3C with the reference numeral 37. The coating film may also be weakly bonded to the fabric, for example by heating its underneath surface before placing it on the fabric such that it will not move relatively to the fabric before it is definitively bonded by vacuum and heat application.

In method step 43 the device is closed, i.e. an optional draping membrane is placed over the fabric and the coating.

In method step 44 a vacuum is applied, that is air is sucked by the holes of the surfaces of the support structure. The vacuum is applied across the coating and the fabric. Thus, the draping membrane is firmly pressed against the coating which in turn is sucked towards the fabric. The vacuum pressure may be 0.1 MPa (100 kg/cm$^2$).

In method step 45 heat is applied to the coating. The heating temperature may be in a range of 150-190° C., and in some embodiments, 160-180° C. Heat may in some embodiments be applied for a duration of between 120 and 240 seconds, for example 180 seconds.

In method step 46 heating is terminated and the coating is cooled. The coating may be cooled down to a temperature of 50-60° C. within 40 seconds.

In method step 47 the vacuum is released.

It should be noted that other optional method steps may be performed before, in between or after the method steps mentioned above. For example, further elements like toe or heel caps, decorations, logos, etc. could be placed on the shoe upper 10.

FIG. 5 shows a flowchart of method steps according to an example of a method of manufacturing a shoe 20 according to the present invention.

In method step 51 a knit shoe upper 10 is provided. Such a knit shoe upper 10 may have been manufactured in a previous method step in one piece for example on a knitting machine. Alternatively, the shoe upper 10 could be cut from a roll of knitted fabric.

In method step 52 method steps 41 to 47 of FIG. 4 are performed to provide a coated fabric.

According to method step 53 the shoe upper 10 is cut to its final in shape. Instead of cutting, the shoe upper 10 could also be punched.

In method step 54 the shoe upper 10 is stitched. First, the back of the heel is stitched, then the bottom of the rearfoot portion is stitched.

In method step 55 the shoe upper 10 is placed on a last and the bottom of the forefoot portion of the shoe upper 10 is stitched.

Finally, in method step 36 the shoe upper 10 is assembled with a sole 21. For example, the shoe upper 10 could be stitched, welded or glued to the sole 21.

It should be noted that other optional method steps may be performed before, in between or after the method steps mentioned above. For example, further elements like toe or heel caps, decorations, logos, etc. could be placed on the shoe upper 10.

Figure 6:
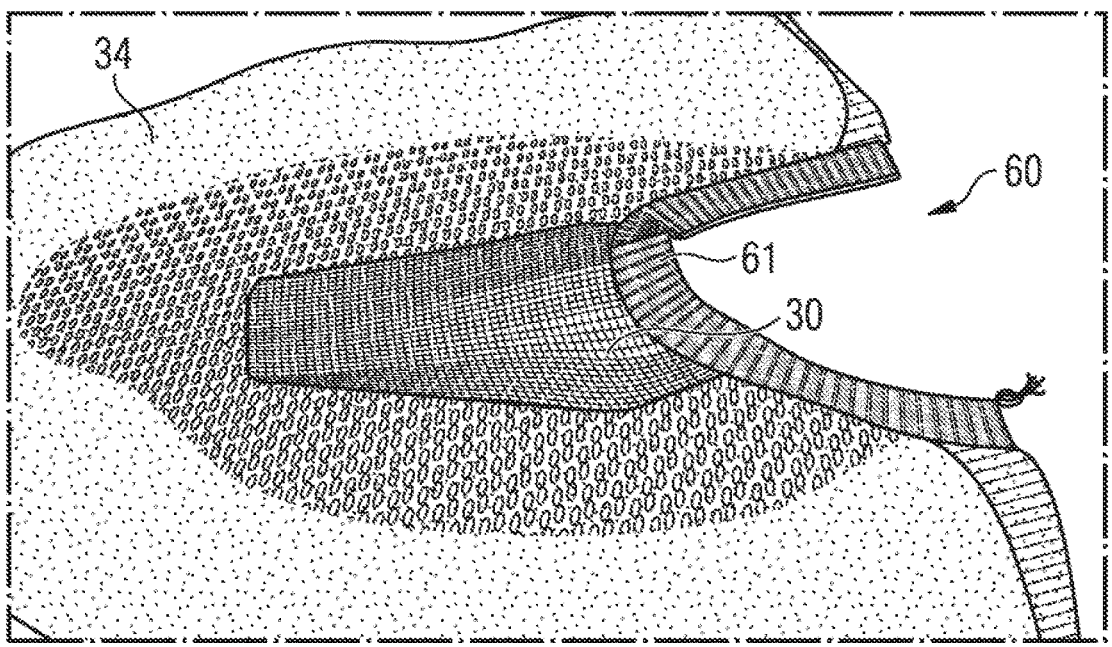
FIG. 6 shows a shoe upper, according to certain embodiments of the present invention.

FIG. 6 shows an example of a shoe upper 60 which has been manufactured according to a method of some embodiments. The shoe upper comprises a fabric 30 with a coating 34 which has been applied as described above with respect to FIGS. 3A, 3B, 3C, 3D and 3E. The fabric in this example is knitted and the coating is a PU coating with a thickness of 0.3 mm. As may be seen in FIG. 6, the coating perfectly conforms to the knitted fabric, even to its texturing.

The dorsal portion (intermediate portion, U-throat) has a raised portion 61 formed during the previous manufacturing steps. Such a raised portion 61 provides a better fit—in particular facilitates the foot insertion and extraction relative to the final shoe—and avoids formation of wrinkles during the manufacturing process.

Figure 7A:
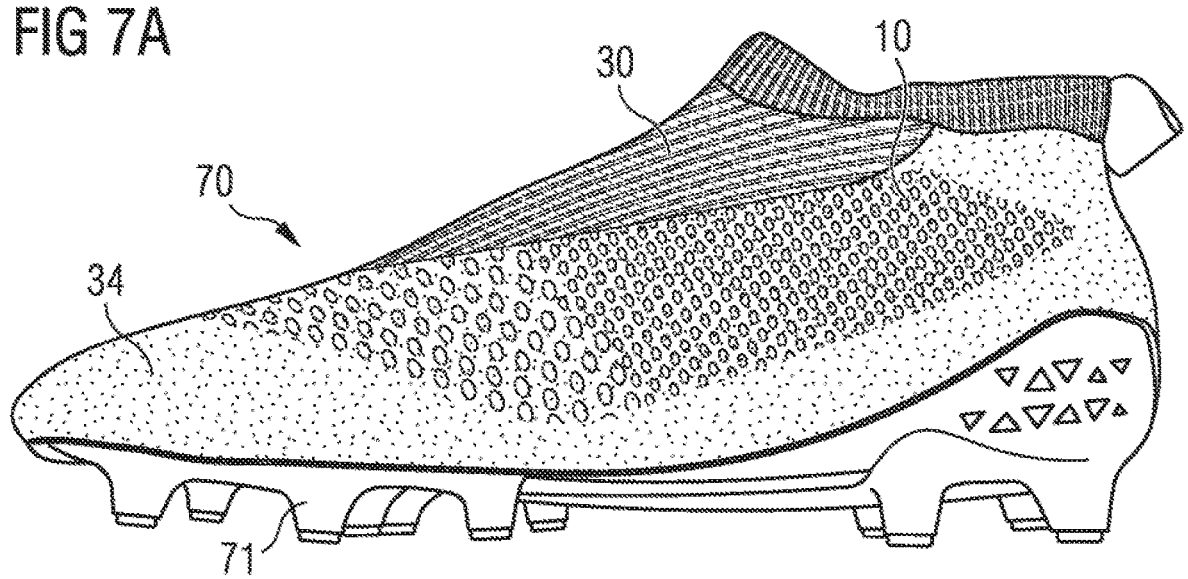
FIG. 7A is a medial view of a shoe, according to certain embodiments of the present invention.
Figure 7B:
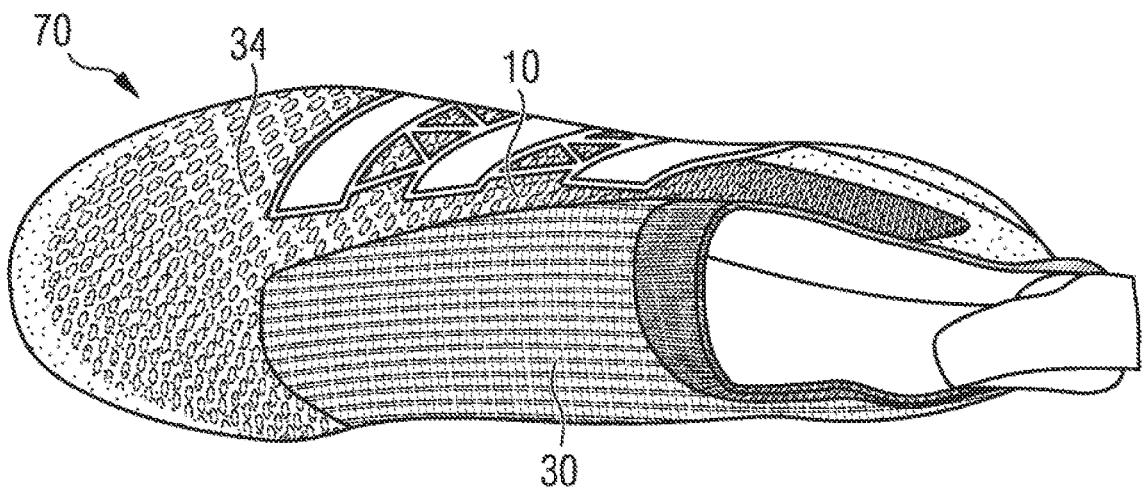
FIG. 7B is a top view of a shoe, according to certain embodiments of the present invention.
Figure 7C:
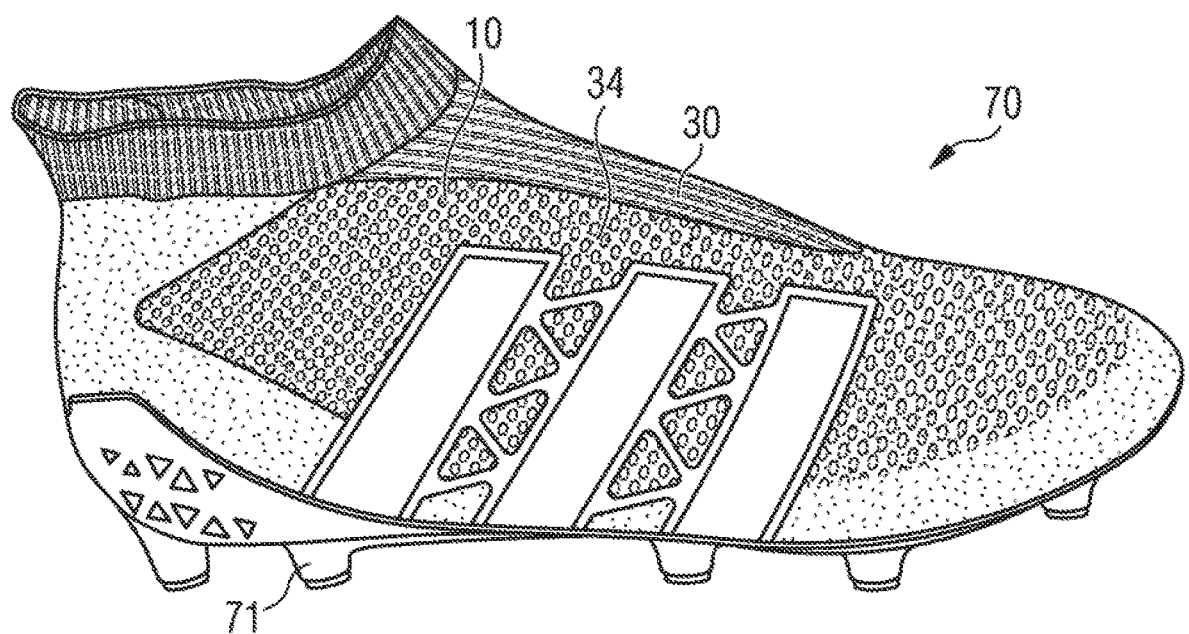
FIG. 7C is a lateral view of a shoe, according to certain embodiments of the present invention.

FIGS. 7A, 7B and 7C show an example of a shoe 70 obtained by the method according to certain embodiments. In this example the article is a soccer shoe 70 comprising a knitted fabric 30 forming the shoe upper 10 and a studded sole 71 joined to the shoe upper 10. In this example the knitted fabric 30 forms the outer layer of the shoe upper 10 in one piece. However, in different embodiments it is possible that the shoe upper 10 is formed by two or more knitted fabrics joined together e.g. by sewing, gluing or welding. It is also possible that the shoe upper 10 comprises in addition to at least one knitted fabric 30 other materials like meshes, woven fabrics, nonwoven fabrics, etc.

In the example of FIGS. 7A, 7B and 7C the shoe 70 is a laceless shoe as described herein. Thus, the shoe upper 10 does not comprise any laces in the area of the instep portion. Instead, the shoe 70 is coupled to the foot of a wearer mainly by the stretch and elasticity of the knitted fabric 30 having in the intermediate portion a stiffness at least two times lower than the stiffness of the lateral and/or medial portion. A tight fit and increased stability is provided by the coating 34 which covers most of the upper, i.e. the medial portion (see FIG. 7A), the lateral portion (see FIG. 7C), the toe portion (see FIG. 7B) and the heel portion (see FIGS. 7A and 7C). In particular the lateral and medial portions of the shoe 70 comprise a stiffness which is at least two times higher than the stiffness of the intermediate portion to provide for enhanced support in particular during cutting movements. The coating 34 is applied to the knitted fabric 30 of the shoe 70 according to the method described above with respect to FIGS. 3A, 3B, 3C, 3D and 3E. In some embodiments, as may be seen in FIGS. 7A, 7B and 7C, the coating perfectly conforms to the knitted fabric, even to its texturing, in particular in the forefoot and medial portions.

Figure 8A:
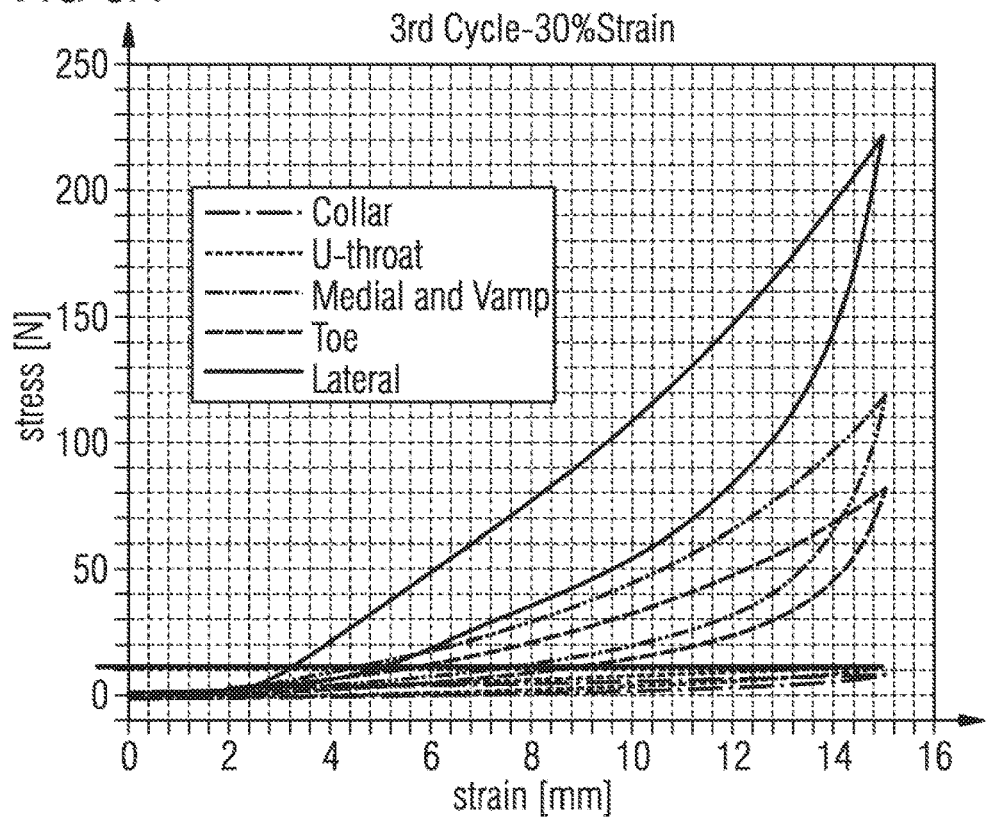
FIGS. 8A and 8B illustrate stress-strain-diagrams obtained by measuring on shoe parts of a shoe, according to certain embodiments of the present invention.
Figure 8B:
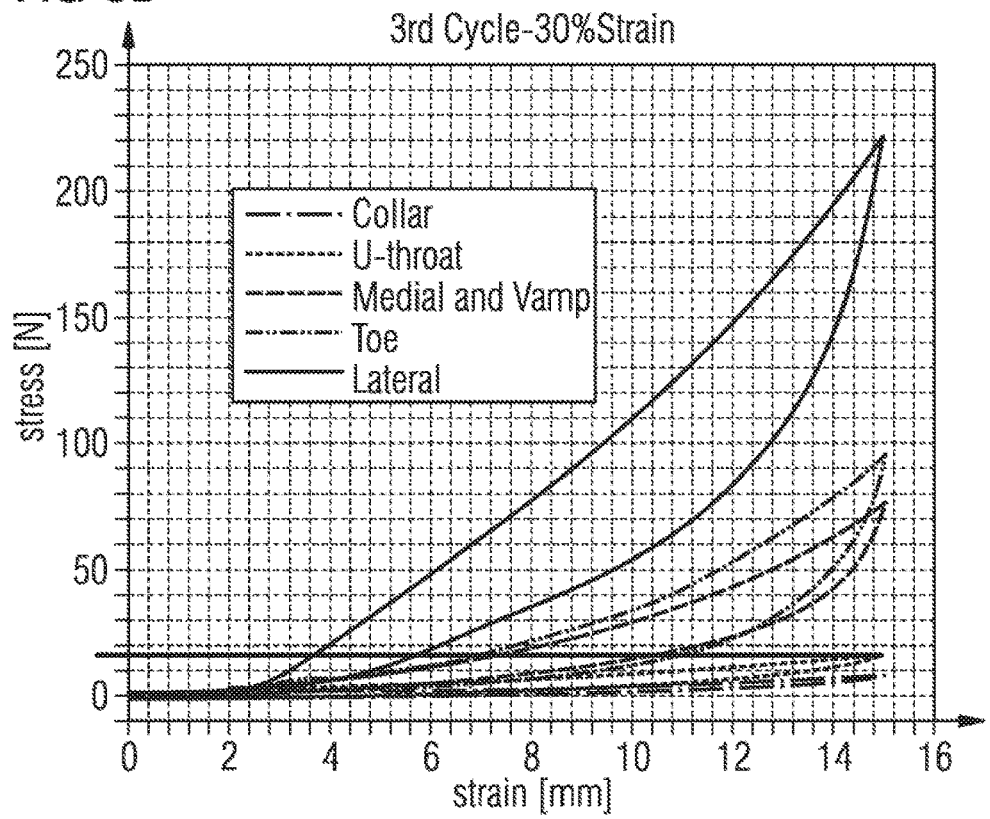

FIGS. 8A and 8B show stress-strain-diagrams which have been obtained by measuring different areas of a shoe according to some embodiments. The measurements have been taken during the third elongation and recovery cycle with a strain of 0% to 30% of samples of 20 mm wide and 50 mm long from clamp to clamp. The ordinate axis represents load values in Newtons; the abscissa axis represents the strain in millimeters. Thereby an abscissa of for example 15 mm is representative of a 30% strain (using samples being 50 mm long from clamp to clamp).

Some examples of values of load (in Newtons) applied to elongate (in percentage of original length) different portions of the shoe at different strain level during elongation are displayed below in table 3, corresponding to FIG. 8A.

TABLE 3

|  | U-throat | Toe | Medial and vamp | Lateral |
| --- | --- | --- | --- | --- |
| 10% | 3 N | 9 N | 13 N | 35 N |
| 15% | 5 N | 19 N | 26 N | 70 N |
| 20% | 7 N | 33 N | 44 N | 109 N |
| 25% | 9 N | 52 N | 72 N | 157 N |
| 30% | 11 N | 81 N | 118 N | 221 N |

As may be seen in both diagrams, at a same stress level on different portions of the shoe upper, the strain is significantly higher in the U-throat portion than in the lateral and medial portions. For example a horizontal line has been drawn on FIG. 8A and FIG. 8B for the load applied to the U-throat to obtain a strain of 30%.

For this load (15.8 N) the values of strain of the other portions of the shoe upper have been measured and reported in the below table 4.

TABLE 4

|  | Load applied | U-throat | Medial and vamp | Lateral |
| --- | --- | --- | --- | --- |
| Shoe upper of FIG. 8A | 15.8 N | 30.0% | 13.9% | 7.5% |
| Shoe upper of FIG. 8B | 11.0 N | 30.0% | 9.0% | 6.5% |

Therefore, for a certain load applied to the shoe upper, the medial and lateral portion will strain much less than the U-throat. During athletic activities, and more particularly cutting-movements the load is mainly applied to the lateral portion of the shoe. The deformation of the shoe during such activities is minimal. On the other hand, when putting the shoe on or off, a high load is applied by the wearer on the dorsal portion of the shoe where the U-throat is situated so as to stretch and facilitate insertion and extraction of the foot in and out of the shoe.

These measurements confirm the results obtained as regards stretch of different portions of the shoe upper measured on shoes during athletic activities (cf. Tables 1 and 2).

While the shoe which was used for the measurement shown in FIG. 8A has a stiffer medial and vamp portion than the toe portion, this is reversed in the shoe which was used for the measurement shown in FIG. 8B.

In the following, further examples are described to facilitate the understanding of the invention:

1. Shoe upper (10) for a shoe, in particular an athletic shoe, wherein the shoe upper (10) is laceless and comprises:
   a. a lateral portion (13);
   b. a medial portion (12, 14); and
   c. at least an elastic intermediate portion (16) between the lateral portion (13) and the medial portion (12, 14), wherein the stiffness of at least one of the lateral portion (13) and the medial portion (12, 14) is at least 2 times higher than the stiffness of the elastic intermediate portion (16).
2. Shoe upper according to example 1, wherein the lateral portion is adapted to extend from a lateral junction of the upper with the sole to the elastic intermediate portion.
3. Shoe upper according to one of the preceding examples, wherein the medial portion is adapted to extend from a medial junction of the upper with the sole to the elastic intermediate portion.
4. Shoe upper according to one of the preceding examples, wherein the shoe upper comprises a unique elastic intermediate portion between the lateral portion and the medial portion.
5. Shoe upper according to one of the preceding examples, wherein the elastic intermediate portion extends at least partly on a dorsal portion.
6. Shoe upper according to one of the preceding examples, wherein at least a part of the center line of the elastic intermediate portion extends in the medial half of the shoe upper.
7. Shoe upper according to one of the preceding examples, wherein the length of the elastic intermediate portion is between 20% and 50% of the length of the shoe upper.
8. Shoe upper according to one of the preceding examples, wherein the width of the elastic intermediate portion is between 10% and 60% of the width of the shoe upper.
9. Shoe upper according to one of the preceding examples, wherein the shoe upper further comprises at least one continuous one-piece layer covering at least partially the lateral portion and at least partially the intermediate portion.
10. Shoe upper according to one of the preceding examples, wherein the stiffness of the medial portion is between 2 and 30 times higher than the stiffness of the intermediate portion.
11. Shoe upper according to one of the preceding examples, wherein the medial portion comprises a coating applied to a base layer, the coating being adapted to modify the stiffness of the base layer.
12. Shoe upper according to example 11, wherein the medial coating extends from back to front of the shoe upper all along the length of the shoe on the medial side.
13. Shoe upper according to one of the preceding examples, wherein the stiffness of the lateral portion is between 3 and 50 times higher than the stiffness of the intermediate portion.
14. Shoe upper according to one of the preceding examples, wherein the lateral portion comprises a coating applied to a base layer, the coating being adapted to modify the stiffness of the base layer.
15. Shoe upper according to example 14, wherein the lateral coating extends from back to front of the shoe upper all along the length of the shoe on the lateral side.
16. Shoe upper according to one of the preceding examples, wherein the shoe upper comprises at least one forefoot portion with a stiffness at least equal to the stiffness of the medial portion.

17. Shoe upper according to one of the preceding examples, wherein the shoe upper comprises at least one forefoot coating applied to the forefoot portion of the shoe upper.
18. Shoe upper according to one of the preceding examples, wherein the shoe upper comprises at least one heel portion comprising a coating applied to a base layer, adapted to modify the stiffness of the base layer.
19. Shoe upper according to one of the preceding examples, wherein the shoe upper comprises one or more coatings applied essentially to an entire base layer of the shoe upper except in the elastic intermediate portion.
20. Shoe upper according to one of the preceding examples, wherein the shoe upper comprises a knitted layer.
21. Shoe upper according to the preceding example, wherein the knitted layer is knitted in one piece and extends on at least 80% of the surface area of the shoe upper.
22. Shoe upper according to one of example 19 or 20, further comprising a first area having a first knit structure and a second area having a second knit structure different from the first knit structure.
23. Shoe upper according to one of the preceding examples, further comprising an elastic collar surrounding the shoe opening.
24. Shoe upper according to one of the preceding examples, further comprising a holding tab proximate the junction between the elastic intermediate portion and a collar of the shoe.
25. Shoe (20), in particular an athletic shoe, comprising:
    a. a sole (21); and
    b. a shoe upper (10) according to one of the preceding examples attached to the sole (21).
26. Shoe according to the preceding example, further comprising a sock arranged at least partially inside the shoe upper.
27. Shoe according to the preceding example, comprising a shoe upper according to example 24, wherein a first end of the holding tap is attached to the shoe upper, and a second end of the holding tap is attached to the sock.
28. Shoe according to the preceding example, wherein the first end of the holding tap is attached to the shoe upper at the top of the intermediate portion.
29. Method of manufacturing a shoe upper (10) according to one of examples 1 to 24, comprising at least the steps of:
    a. forming the lateral portion (13);
    b. forming the medial portion (12, 14); and
    c. forming the elastic intermediate portion (16), such that the stiffness of at least one of the lateral portion (13) and the medial portion (12, 14) is at least two times higher than the stiffness of the elastic intermediate portion (16).
30. Method according to example 29, further comprising the step of coating the lateral portion and/or the medial portion at least partially.
31. Method according to one of examples 29 or 30, wherein the lateral portion and/or the medial portion comprises a fabric.
32. Method according to example 31, further comprising the steps of:
    a. providing the fabric comprising a first surface and a second surface opposite the first surface;
    b. placing the fabric on a surface of a support structure, wherein the support structure is adapted to permit gas circulation through at least a portion of its surface and comprises at least a raised or embossed portion on its surface, and wherein the fabric is placed such that the first surface of the fabric faces the surface of the support structure and such that the fabric is arranged at least in part over the raised or embossed portion of the support structure;
    c. providing at least one coating comprising a first surface and a second surface opposite the first surface;
    d. placing the coating at least partially on the second surface of the fabric, such that the first surface of the coating faces the fabric; and
    e. applying a gas pressure differential between the second surface of the coating (14) and the first surface of the fabric (10).
33. Method according to one of examples 31 or 32, wherein the fabric is a knitted fabric.
34. Method according to the preceding example, further comprising the step of placing a draping membrane on the fabric and the coating before the pressure differential is applied.
35. Method according to one of examples 32 to 34, further comprising the step of heating the coating.
36. Method according to the preceding example, wherein the step of heating the coating is performed at least partly simultaneously with the step of applying a gas pressure differential.
37. Method according to one examples 32 to 36, wherein the coating is a film.
38. Method according to the preceding example, wherein the coating has a thickness between 0.02 mm and 3 mm.
39. Method according to one of the preceding examples, wherein the coating is a thermoplastic coating.
40. Method according to one of the preceding examples, wherein the coating is a polymer with a hardness in the range of 40-80 Shore A.
41. Method according to one of examples 32 to 40, wherein the step of providing at least one coating comprises providing a plurality of coatings and the step of placing the coating comprises placing the plurality of coatings.
42. Method according to one of examples 32 to 41, wherein the raised or embossed portion of the support structure corresponds to an ankle portion and a top portion of a dorsal part of a last.
43. Method according to one of examples 32 to 42, wherein the support structure has the shape of a shoe last.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:
1. A method of forming a laceless shoe upper for a shoe, the method comprising:

arranging a base fabric over a projection of a support surface so that an intermediate portion of the base fabric between a lateral portion and a medial portion is arranged over the projection to form a cupped portion cupped above the lateral portion and the medial portion;

applying a first coating portion to a first base fabric portion incorporated in the lateral portion;

applying a second coating portion to a second base fabric portion incorporated in the medial portion, wherein the cupped portion is uncoated by the first coating portion and the second coating portion;

applying heat to a coating that comprises the first coating portion and the second coating portion;

shielding, from the heat, the cupped portion that is uncoated by the first coating portion and the second coating portion; and bonding, at least in part from the heat being applied, the first coating portion with the first base fabric portion and the second coating portion with the second base fabric portion such that the cupped portion that is uncoated by the first coating portion and the second coating portion remains cupped above the lateral portion and the medial portion upon removal of the intermediate portion from over the projection.

2. The method of claim 1, further comprising applying a gas pressure differential across the base fabric and the coating that comprises the first coating portion and the second coating portion, wherein the bonding results at least in part from the gas pressure differential being applied.

3. The method of claim 2, further comprising placing a draping membrane over at least the cupped portion prior to applying the gas pressure differential.

4. The method of claim 3, further comprising placing the draping membrane over the cupped portion and the coating prior to applying the gas pressure differential.

5. The method of claim 1, wherein the first coating portion and the second coating portion are applied to the base fabric prior to the base fabric being arranged over the projection.

6. The method of claim 1, wherein the first coating portion and the second coating portion are applied to the base fabric subsequent to the base fabric being arranged over the projection.

7. The method of claim 1, wherein:
the lateral portion is adapted to extend from a lateral junction of the upper with a sole to the intermediate portion; and
the medial portion is adapted to extend from a medial junction of the upper with the sole to the intermediate portion.

8. The method of claim 1, wherein the intermediate portion extends at least partly on a dorsal portion of the shoe upper.

9. The method of claim 1, wherein the base fabric comprises a continuous one-piece layer that at least partially incorporates the lateral portion and at least partially incorporates the intermediate portion.

10. The method of claim 1, wherein the base fabric comprises a knitted layer further comprising a first area having a first knit structure and a second area having a second knit structure different from the first knit structure.

11. A method of forming a laceless shoe upper comprising:
receiving a base fabric and a coating relative to a support surface having a projection such that:
an intermediate portion of the base fabric between a lateral portion and a medial portion is arranged over the projection to form a portion raised above the lateral portion and the medial portion;
a first coating portion of the coating is arranged on a first base fabric portion incorporated in the lateral portion;
a second coating portion of the coating is arranged on a second base fabric portion incorporated in the medial portion; and
the raised portion of the intermediate portion is uncoated by the first coating portion and the second coating portion;
applying heat to the coating that comprises the first coating portion and the second coating portion;
shielding, from the heat, the raised portion that is uncoated by the first coating portion and the second coating portion; and
bonding the coating with the base fabric such that the raised portion maintains a shape of being raised above the lateral portion and the medial portion upon removal of the intermediate portion from over the projection.

12. The method of claim 11, wherein the bonding is accomplished by
applying a pressure differential across the coating and the base fabric in combination with the applying heat to the coating.

13. A method, comprising:
placing a coating on a base fabric so that a medial portion and a lateral portion of the base fabric are coated by the coating and so that an intermediate portion of the base fabric between the medial portion and the lateral portion is uncoated by the coating;
placing the base fabric on a support surface having a projection such that a cupped portion of the intermediate portion is arranged being cupped over the projection and above the medial portion and the lateral portion;
applying heat to the coating;
shielding the cupped portion from the heat;
bonding the coating to the base fabric so that the cupped portion is retained upon removal of the cupped portion from over the projection; and
forming a shoe upper from the base fabric bonded with the coating and having the retained cupped portion.

14. The method of claim 13, further comprising coupling the shoe upper with a sock arranged at least partially inside the shoe upper.

15. The method of claim 13, further comprising forming a shoe by coupling the shoe upper with a sole.

16. The method of claim 13, wherein the cupped portion is formed to retain a cupped shape and holds a portion of a rim of a foot opening of the shoe upper at least partially upright to keep from collapsing into a position obstructing a portion of the foot opening and to facilitate introduction of a foot into the shoe upper.

17. The method of claim 13, wherein the cupped portion of the intermediate portion is configured to deform so as to permit introduction of a foot of a wearer in the shoe upper and extraction of the foot out of the shoe upper and is configured to be located over an instep of the foot of the wearer when the shoe upper is worn.

* * * * *